(12) United States Patent
Sanghvi et al.

(10) Patent No.: US 11,321,104 B2
(45) Date of Patent: May 3, 2022

(54) COGNITIVE AUTOMATION PLATFORM FOR CUSTOMIZED INTERFACE GENERATION

(71) Applicant: Bank of America Corporation, Charlotte, NC (US)

(72) Inventors: Siten Sanghvi, Westfield, NJ (US); Jeffrey A. Young, Cohoes, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/833,982

(22) Filed: Mar. 30, 2020

(65) Prior Publication Data

US 2021/0303317 A1 Sep. 30, 2021

(51) Int. Cl.
| | |
|---|---|
| *G06F 9/451* | (2018.01) |
| *G06F 3/048* | (2013.01) |
| *G06F 16/9035* | (2019.01) |
| *G06F 8/38* | (2018.01) |
| *G07F 19/00* | (2006.01) |

(52) U.S. Cl.
CPC ............. *G06F 9/451* (2018.02); *G06F 8/38* (2013.01); *G06F 16/9035* (2019.01); *G06F 3/048* (2013.01); *G07F 19/206* (2013.01)

(58) Field of Classification Search
CPC ........ G06F 9/451; G06F 16/9035; G06F 8/38; G06F 3/048; G07F 19/206
See application file for complete search history.

(56) References Cited

U.S. PATENT DOCUMENTS

| | | | |
|---|---|---|---|
| 5,155,803 | A | 10/1992 | Barabash et al. |
| 5,204,940 | A | 4/1993 | Kitagawa et al. |
| 5,581,664 | A | 12/1996 | Allen et al. |
| 6,026,399 | A | 2/2000 | Kohavi et al. |
| 6,086,617 | A | 7/2000 | Waldon et al. |
| 6,088,689 | A | 7/2000 | Kohn et al. |

(Continued)

OTHER PUBLICATIONS

David Schatsky et al. "Robotic process automation: A path to the cognitive enterprise" Deloitte University Press, Signals for Strategists, 2016 Deloitte Development LLC, pp. 1-10.

*Primary Examiner* — Kavita Stanley
*Assistant Examiner* — William Wong
(74) *Attorney, Agent, or Firm* — Banner & Witcoff, Ltd.

(57) ABSTRACT

Aspects of the disclosure relate to using cognitive automation for customized interface generation. A computing platform may receive user interaction information. Based on the user interaction information, the computing platform may identify a user intent. Using a cognitive automation model, the computing platform may identify a final graphical user interface corresponding to the user intent, where the final graphical user interface may be a last graphical user interface, of a sequence of graphical user interfaces, that was displayed at a user device to satisfy the user intent. The computing platform may send commands directing an enterprise source host system to cause display of the final graphical user interface without causing display of preceding graphical user interfaces of the sequence of graphical user interfaces. The computing platform may receive a feedback message indicating a level of satisfaction with the final graphical user interface and may update the cognitive automation model accordingly.

20 Claims, 14 Drawing Sheets

(56) References Cited

U.S. PATENT DOCUMENTS

| | | | |
|---|---|---|---|
| 6,134,580 A | 10/2000 | Tahara et al. | |
| 6,336,109 B2 | 1/2002 | Howard | |
| 6,349,325 B1 | 2/2002 | Newcombe et al. | |
| 6,415,224 B1 | 7/2002 | Wako et al. | |
| 6,493,697 B1 | 12/2002 | Stier et al. | |
| 6,745,089 B2 | 6/2004 | Rasmussen et al. | |
| 6,816,847 B1 | 11/2004 | Toyama | |
| 6,851,115 B1 | 2/2005 | Cheyer et al. | |
| 6,859,931 B1 | 2/2005 | Cheyer et al. | |
| 6,990,670 B1 | 1/2006 | Hodjat | |
| 7,036,128 B1 | 4/2006 | Julia et al. | |
| 7,124,119 B2 | 10/2006 | Bigus et al. | |
| 7,644,048 B2 | 1/2010 | Vane et al. | |
| 9,208,153 B1* | 12/2015 | Zaveri | G06F 16/437 |
| 9,939,823 B2 | 4/2018 | Ovadia | |
| 10,289,949 B2 | 5/2019 | Baughman et al. | |
| 10,467,029 B1* | 11/2019 | Lin | G06F 9/451 |
| 10,579,079 B2 | 3/2020 | Ovadia | |
| 2001/0039562 A1 | 11/2001 | Sato | |
| 2002/0116350 A1 | 8/2002 | Hodjat et al. | |
| 2003/0212760 A1* | 11/2003 | Chen | G06F 16/954 709/218 |
| 2004/0107190 A1 | 6/2004 | Gilmour et al. | |
| 2004/0198386 A1 | 10/2004 | Dupray | |
| 2005/0114500 A1 | 5/2005 | Monk et al. | |
| 2005/0114859 A1 | 5/2005 | Srinivasa | |
| 2007/0011281 A1 | 1/2007 | Jhoney et al. | |
| 2007/0112696 A1 | 5/2007 | Vane et al. | |
| 2008/0070217 A1 | 3/2008 | Lopez et al. | |
| 2009/0319357 A1* | 12/2009 | Flake | G06Q 30/0601 705/14.25 |
| 2010/0083217 A1* | 4/2010 | Dalal | G06F 3/0482 717/106 |
| 2011/0185273 A1* | 7/2011 | DaCosta | G06Q 99/00 715/234 |
| 2011/0219030 A1* | 9/2011 | Billsus | G06Q 30/0641 707/770 |
| 2012/0198547 A1* | 8/2012 | Fredette | G06F 9/451 726/19 |
| 2012/0330869 A1 | 12/2012 | Durham | |
| 2013/0238783 A1* | 9/2013 | Alexander | G06F 16/954 709/224 |
| 2015/0355649 A1 | 12/2015 | Ovadia | |
| 2017/0006114 A1* | 1/2017 | Mande | G07F 19/211 |
| 2017/0255671 A1 | 9/2017 | Christian et al. | |
| 2017/0337079 A1* | 11/2017 | Portnoy | G06F 9/48 |
| 2018/0239377 A1 | 8/2018 | Ovadia | |
| 2018/0239500 A1* | 8/2018 | Allen | G06F 3/0488 |
| 2018/0365617 A1 | 12/2018 | Ghosh et al. | |
| 2019/0244149 A1 | 8/2019 | Krishnaswamy | |
| 2019/0306011 A1 | 10/2019 | Fenoglio et al. | |
| 2019/0347282 A1 | 11/2019 | Cai et al. | |
| 2019/0349321 A1 | 11/2019 | Cai et al. | |
| 2020/0022016 A1 | 1/2020 | Fenoglio et al. | |
| 2020/0097357 A1 | 3/2020 | Shwartz et al. | |

\* cited by examiner

305

Home Screen

What would you like to do today?

| Deposit | Withdraw | Transfer |

Interim Screen

Please select an account to which you would like to make a deposit:

| Checking | Savings |

Final Screen

Please insert your check. A deposit will be made to your checking account.

Feedback Interface

Did the presented interface match your intent?

Checking    Savings

FIG. 6

COGNITIVE AUTOMATION PLATFORM FOR CUSTOMIZED INTERFACE GENERATION

BACKGROUND

Aspects of the disclosure relate to customized interface generation. In particular, one or more aspects of the disclosure relate to computing platforms that apply cognitive automation to generating user interfaces.

In some cases, enterprise organizations such as financial institutions may receive requests to perform various actions (e.g., change account information, process a transaction, or the like). In some instances, these requests may be provided through a decision tree of user interfaces, which each may be presented based on a user input provided at a previous interface. In some instances, however, implementation of such user interfaces may require that requesting individuals step through each of the user interfaces to reach a final interface that causes the requested action to be performed. These deficiencies may result in processing inefficiencies, and as a result, it may be difficult for enterprise organizations to efficiently process requested actions.

SUMMARY

Aspects of the disclosure provide effective, efficient, scalable, and convenient technical solutions that address and overcome the technical problems associated with presentation of graphical user interfaces. For example, some aspects of the disclosure provide techniques that enable computing platforms to apply cognitive automation to automatically predict a final user interface of a sequence of user interfaces used to satisfy a particular intent. The computing platforms may predict the final user interface based on previously identified interaction patterns and intents for a particular user and other users with similar user profiles. In doing so, the computing platforms may provide a shortcut to the final user interface on an initially displayed interface of the sequence of user interfaces and/or automatically direct the user to the final user interface without receiving further input from the user.

By implementing one or more aspects of the disclosure, various technical advantages may be realized. For example, one technical advantage of using cognitive automation in user interface identification and generation is that such techniques may expedite computing methods corresponding to the identified intents. Specifically, this approach may prevent users from spending time repeatedly working through a decision tree represented by numerous user interfaces to perform a desired action. Furthermore, one or more of the systems and methods described herein may improve storage capacity at one or more computing systems by reducing a number of user interfaces that are stored. For example, if a particular user interface is rarely or never accessed, the systems may remove this interface from storage. Similarly, the systems and methods described herein may conserve network bandwidth by reducing back and forth communication between enterprise user devices and enterprise source host systems.

In accordance with one or more embodiments of the disclosure, a computing platform comprising at least one processor, a communication interface, and memory storing computer-readable instructions may receive first user interaction information. Based on the first user interaction information, the computing platform may identify a first user intent. Using a cognitive automation model, the computing platform may identify a final graphical user interface corresponding to the first user intent, wherein the final graphical user interface comprises a last graphical user interface, of a sequence of graphical user interfaces that was displayed at a user device to satisfy the first user intent. The computing platform may send one or more commands directing an enterprise source host system to cause display of the final graphical user interface without causing display of preceding graphical user interfaces of the sequence of graphical user interfaces. The computing platform may receive, from the user device, a feedback message indicating a level of satisfaction with the final graphical user interface. Based on the feedback message, the computing platform may update, based on the feedback message, the cognitive automation model.

In one or more embodiments, the computing platform may receive second user interaction information. By comparing the second user interaction information to the first user interaction information, the computing platform may identify that the second user interaction information corresponds to the first user intent. Using the cognitive automation model, the computing platform may identify the final graphical user interface corresponding to the first user intent. The computing platform may send one or more commands directing the enterprise source host system to cause display of the final graphical user interface without causing display of the preceding graphical user interfaces of the sequence of graphical user interfaces. In one or more embodiments, the first user interaction information may correspond to a first user profile and the second user interaction information may correspond to a second user profile.

In one or more embodiments, sending the one or more commands directing the enterprise source host system to cause display of the final graphical user interface without causing display of the preceding graphical user interfaces of the sequence of graphical user interfaces may cause the user device to transition from an initial graphical user interface to the final graphical user interface, without causing display of the preceding graphical user interfaces of the sequence of graphical user interfaces and without prompting a user to request the final graphical user interface. In one or more embodiments, sending the one or more commands directing the enterprise source host system to cause display of the final graphical user interface without causing display of the preceding graphical user interfaces of the sequence of graphical user interfaces may cause the user device to display, on an initial graphical user interface, a shortcut to access the final graphical user interface, wherein selection of the shortcut to access the final graphical user interface causes the user device to transition from the initial graphical user interface to the final graphical user interface, without causing display of the preceding graphical user interfaces of the sequence of graphical user interfaces.

In one or more embodiments, the user device may be an automated teller machine, a personal computing device, or the like. In one or more embodiments, the computing platform may receive second user interaction information. The computing platform may determine that the second user interaction information does not correspond to a previously identified intent. The computing platform may generate one or more commands directing the enterprise source host system to present interim graphical user interfaces until a final graphical user interface corresponding to a second user intent is accessed. Using the second user interaction information and the second user intent, the computing platform may update the cognitive automation model.

In one or more embodiments, the computing platform may receive second user interaction information. Based on the second user interaction information, the computing platform may identify a second user intent. Using the cognitive automation model, the computing platform may identify that the second user intent does not match another user intent stored in the cognitive automation model. In one or more instances, the computing platform may generate one or more commands directing the enterprise source host system to present interim graphical user interfaces until a final graphical user interface corresponding to the second user intent is accessed. Using the second user intent and the final graphical user interface corresponding to the second user intent, the computing platform may update the cognitive automation model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for implementing cognitive automation techniques for customized user interface generation in accordance with one or more example embodiments;

FIGS. 3-6 depict illustrative user interfaces for implementing cognitive automation techniques for customized user interface generation in accordance with one or more example embodiments.

DETAILED DESCRIPTION

Figure 1A:
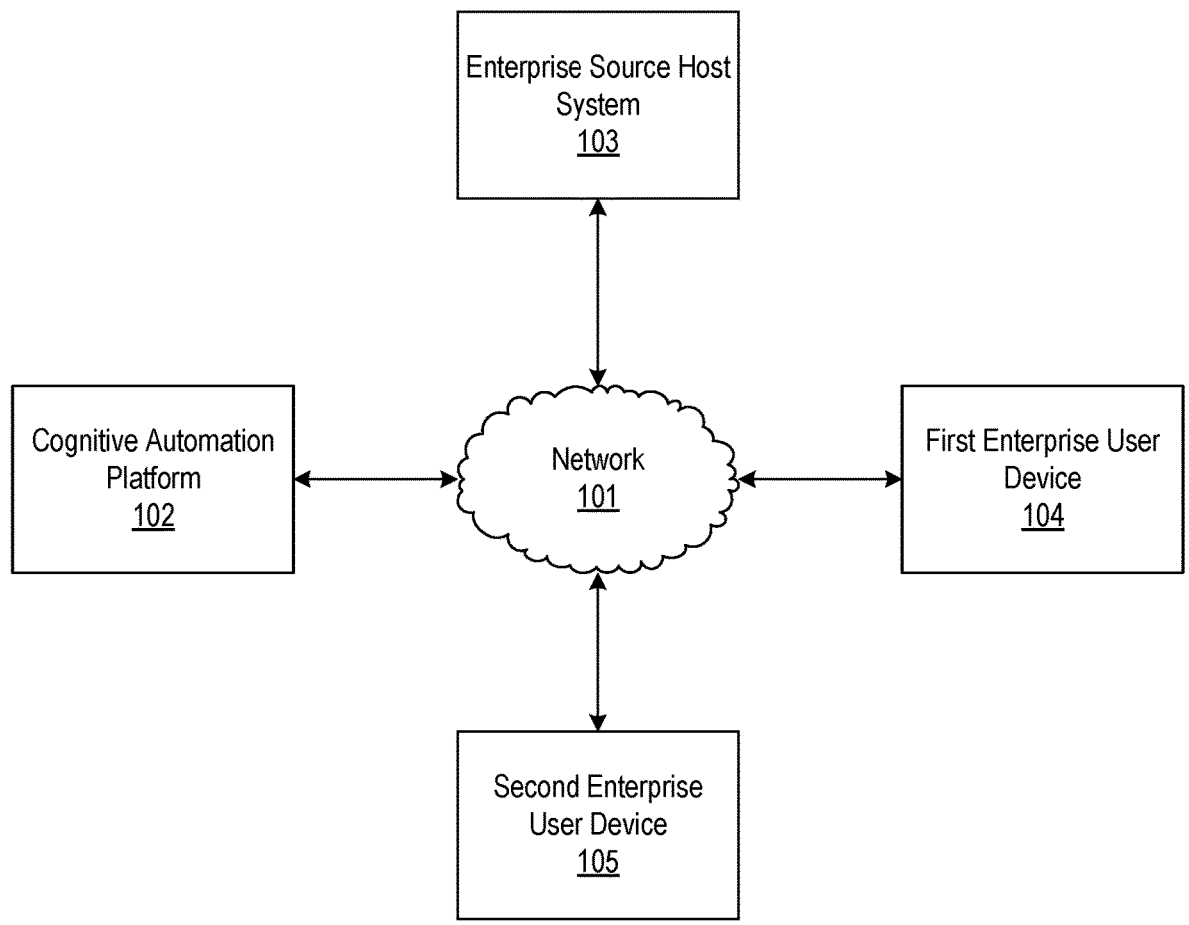
FIGS. 1A-1B depict an illustrative computing environment for implementing cognitive automation techniques for customized user interface generation in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively implement cognitive automation for customized user interface generation. For example, one or more of the systems and methods described herein are directed towards using artificial intelligence to monitor application usage and/or navigation/interaction patterns, and to provide a user interface recommendation accordingly. In one or more instances, artificial intelligence may be used to provide recommendations based on actions performed routinely. For example, creation of a monthly report may be identified using pattern recognition based on a user's navigation/interaction patterns within an application, and the one or more of the systems described herein may use cognitive automation to provide recommendations to the user and automate the process (e.g., recommend that the monthly report be created on the first of the month). In one or more instances, based on frequently accessed features, a user interface may be dynamically modified/customized on a user by user basis to show only relevant features that each user frequently uses. In these instances, one or more of the systems and methods described herein may remove unused features from a user interface to a different tab, navigation page, or the like, so as to declutter a landing page.

Accordingly, by performing the one or more methods described herein, one or more technical advantages may be realized. For example, one technical advantage of using cognitive automation in user interface customization is that such techniques may expedite computing methods corresponding to the identified intents. This approach may prevent users from having to spend time repeatedly working through a decision tree represented by numerous user interfaces to perform a desired action. Furthermore, one or more of the systems and methods described herein may improve storage capacity at one or more computing systems by reducing a number of stored user interfaces. For example, if a particular user interface is rarely or never accessed, the systems may remove this interface from storage. Similarly, the systems and methods described herein may conserve network bandwidth by reducing back and forth communication between enterprise user devices and enterprise source host systems.

Figure 1B:
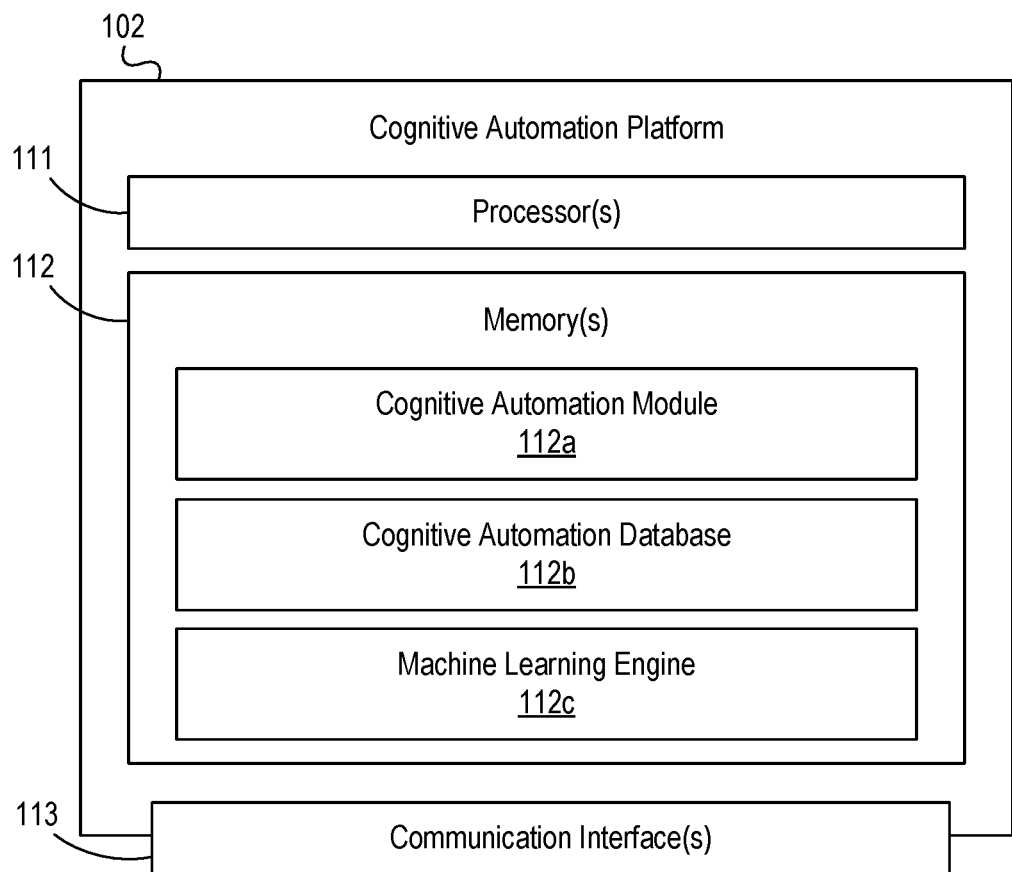

FIGS. 1A-1B depict an illustrative computing environment that implements cognitive automation techniques for customized user interface generation in accordance with one or more example embodiments. Referring to FIG. 1A, computing environment 100 may include one or more computer systems. For example, computing environment 100 may include a cognitive automation platform 102, an enterprise source host system 103, a first enterprise user device 104, and a second enterprise user device 105.

As described further below, cognitive automation platform 102 may be a computer system that includes one or more computing devices (e.g., servers, server blades, or the like) and/or other computer components (e.g., processors, memories, communication interfaces) that may be used to implement cognitive automation, machine learning algorithms, artificial intelligence, or the like to recognize interaction patterns and generate user interfaces accordingly (e.g., application interfaces, web interfaces, automated teller machine (ATM) interfaces, or the like). In some instances, the cognitive automation platform 102 may be maintained by an enterprise organization (e.g., a financial institution, or the like) and may be configured to identify an intent associated with user interactions (e.g., generate report, process transaction, perform withdrawal/deposit, or the like), identify a final graphical user interface corresponding to processing of the identified intent, and expedite the process of reaching the final graphical user interface (e.g., by automatically launching the final graphical user interface without interim interfaces, by presenting a shortcut icon linked to the final graphical user interface, or the like). In some instances, the cognitive automation platform 102 may be configured to maintain a cognitive automation model that stores correlations between user interaction information, user intents, and/or final user interfaces, and may be configured to update the cognitive automation model based on received feedback.

Enterprise source host system 103 may be a server, server blade, or the like configured to host an enterprise service (e.g., a mobile banking application, ATM service, or the like). In one or more instances, the enterprise source host system 103 may be configured to communicate with enterprise user devices (e.g., first enterprise user device 104, second enterprise user device 105, or the like) to cause display of various user interfaces based on user input received at the enterprise user devices. In some instances, the enterprise source host system 103 may be configured to cause display (e.g., at first enterprise user device 104, second enterprise user device 105, or the like), of a particular user interface based on commands received from the cognitive automation platform 102.

First enterprise user device 104 may be a desktop computer, laptop computer, tablet, mobile device, ATM, or the like, and may be used by an individual such as a client or employee of an enterprise organization (e.g., a financial institution, or the like). For example, first enterprise user device 104 may be configured to communicate with enterprise source host system 103 to facilitate display of user interfaces (e.g., interfaces that allow the individual to perform a task such as generate a report, conduct a transaction, perform a deposit/withdrawal, or the like) based on received user input.

Second enterprise user device 105 may be a desktop computer, laptop computer, tablet, mobile device, ATM, or the like, and may be used by an individual such as a client or employee of an enterprise organization (e.g., a financial institution, or the like). For example, second enterprise user device 105 may be configured to communicate with enterprise source host system 103 to facilitate display of user interfaces (e.g., interfaces that allow the individual to perform a task such as generate a report, conduct a transaction, perform a deposit/withdrawal, or the like) based on received user input.

Computing environment 100 also may include one or more networks, which may interconnect cognitive automation platform 102, enterprise source host system 103, first enterprise user device 104, second enterprise user device 105, or the like. For example, computing environment 100 may include a network 101 (which may interconnect, e.g., cognitive automation platform 102, enterprise source host system 103, first enterprise user device 104, second enterprise user device 105, or the like).

In one or more arrangements, cognitive automation platform 102, enterprise source host system 103, first enterprise user device 104, and second enterprise user device 105 may be any type of computing device capable of sending and/or receiving requests and processing the requests accordingly. For example, cognitive automation platform 102, enterprise source host system 103, first enterprise user device 104, second enterprise user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cognitive automation platform 102, enterprise source host system 103, first enterprise user device 104, and/or second enterprise user device 105 may, in some instances, be special-purpose computing devices configured to perform specific functions.

Referring to FIG. 1B, cognitive automation platform 102 may include one or more processors 111, memory 112, and communication interface 113. A data bus may interconnect processor 111, memory 112, and communication interface 113. Communication interface 113 may be a network interface configured to support communication between cognitive automation platform 102 and one or more networks (e.g., network 101, or the like). Memory 112 may include one or more program modules having instructions that when executed by processor 111 cause cognitive automation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of cognitive automation platform 102 and/or by different computing devices that may form and/or otherwise make up cognitive automation platform 102. For example, memory 112 may have, host, store, and/or include cognitive automation module 112a, cognitive automation database 112b, and a machine learning engine 112c.

Cognitive automation module 112a may have instructions that direct and/or cause cognitive automation module to execute advanced cognitive automation techniques related to user interface generation, as discussed in greater detail below. Cognitive automation database 112b may store information used by cognitive automation module 112a and/or cognitive automation platform 102 in application of cognitive automation techniques related to user interface generation, and/or in performing other functions. Machine learning engine 112c may have instructions that direct and/or cause the cognitive automation platform 102 to set, define, and/or iteratively refine optimization rules and/or other parameters used by the cognitive automation platform and/or other systems in computing environment 100.

Figure 2A:
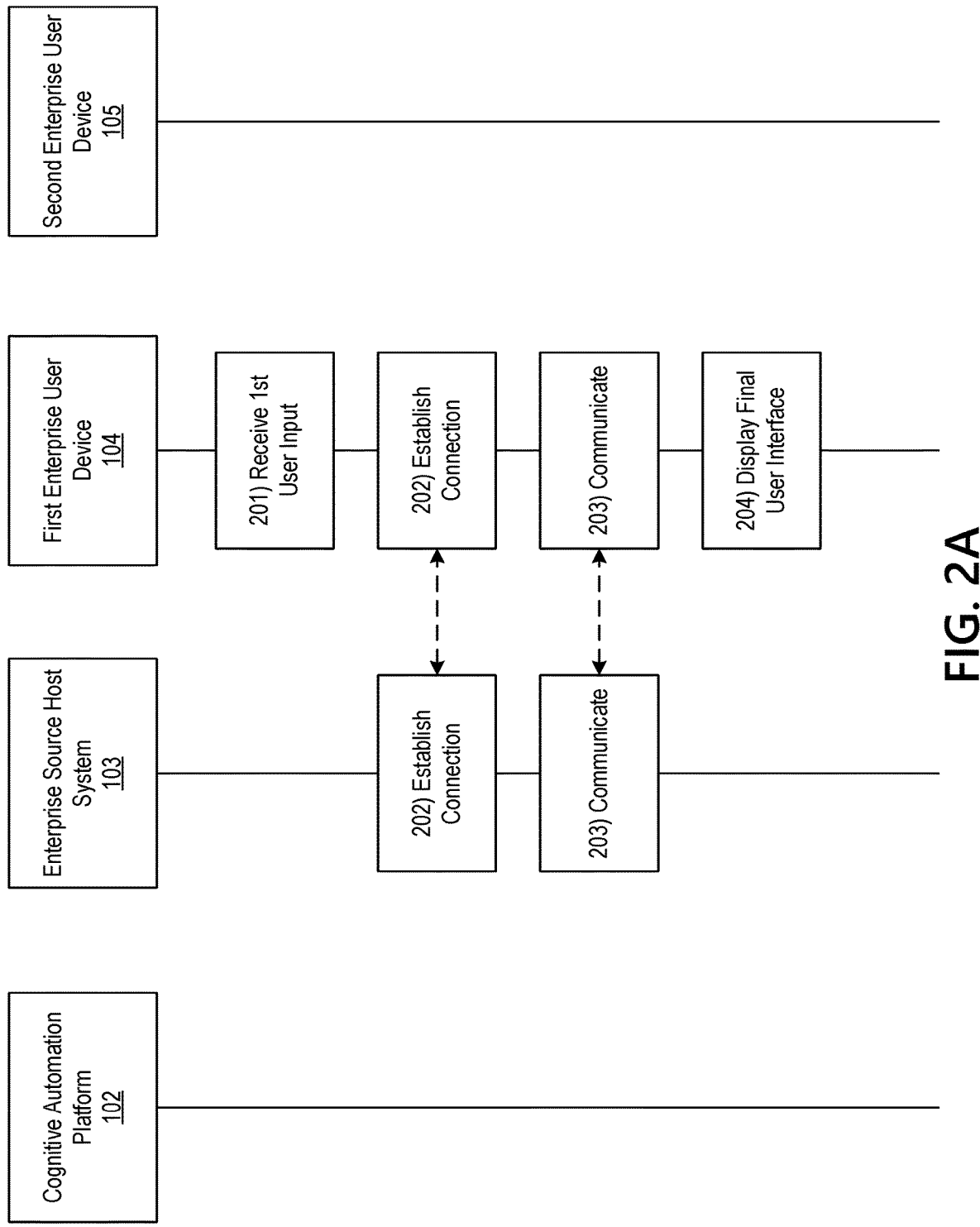

FIGS. 2A-2I depict an illustrative event sequence that implements cognitive automation in user interface generation in accordance with one or more example embodiments. Referring to FIG. 2A, at step 201, first enterprise user device 104 may receive a first user input, which may be a request to access an enterprise service (e.g., a mobile banking service, ATM service, web service, internal enterprise service, or the like). For example, in receiving the first user input, the first enterprise user device 104 may receive touch input, gesture input, voice input, or the like requesting access to the enterprise service.

At step 202, the first enterprise user device 104 may establish a connection with the enterprise source host system 103. For example, the first enterprise user device 104 may establish a first wireless data connection with the enterprise source host system 103 to link the first enterprise user device 104 to the enterprise source host system 103. In some instances, first enterprise user device 104 may identify whether a connection is already established with the enterprise source host system 103. If a connection is already established with the enterprise source host system 103, the first enterprise user device 104 might not re-establish the connection. If a connection is not already established with the enterprise source host system 103, the first enterprise user device 104 may establish the first wireless data connection as described herein.

At step 203, the first enterprise user device 104 may communicate with the enterprise source host system 103 to provide the first user access to the enterprise service requested in step 201. In some instances, the first enterprise user device 104 and the enterprise source host system 103 may communicate while the first wireless data connection is established. In some instances, based on the communication with the enterprise source host system 103, the first enterprise user device 104 may display one or more graphical user interfaces corresponding to the enterprise service. As an example, the first enterprise user device 104 may be an ATM, and the first enterprise user device 104 may communicate with the enterprise source host system 103 (which may, e.g., be a control server for the ATM) to cause display of graphical user interfaces to the first user, which may allow the first user to perform a task (e.g., generate report, process transaction, deposit/withdraw funds, or the like). For example, in causing display of the graphical user interfaces, after receiving a user PIN number, the first enterprise user device 104 may display a graphical user interface similar to graphical user interface 305, which is illustrated in FIG. 3. For example, the first enterprise user device 104 may display a home screen that may present the first user with one or more tasks that may be performed using the enterprise service (e.g., use the ATM to perform a deposit, withdrawal, transfer of funds, or the like). Based on a selection on the graphical user interface 305 by the first user, the first enterprise user device 104 may transition to a subsequent graphical user interface, which may, e.g., be a graphical interface similar to graphical user interface 405, which is illustrated in FIG. 4. For example, the first enterprise user device 104 may display an interim screen that may present the first user with one or more options regarding the selected task (e.g., deposit money to a checking account or a savings account). In some instances, in communicating with the enterprise source host system 103, the first enterprise user device 104 may display a plurality of such graphical user interfaces, which may allow the first enterprise user device 104 to work through a decision tree related to the enterprise service and to identify an action to perform accordingly.

At step 204, the first enterprise user device 104 may display a final user interface. For example, the first enterprise user device 104 may display an interface representative of an end of the decision tree that may allow the first user to perform a particular action. In some instances, the first enterprise user device 104 may display a graphical user interface similar to graphical user interface 505, which is shown in FIG. 5. For example, after receiving user input on a plurality of preceding user interfaces, the first enterprise user device 104 may display a user interface that facilitates deposit of a check into the first user's checking account.

Figure 2B:
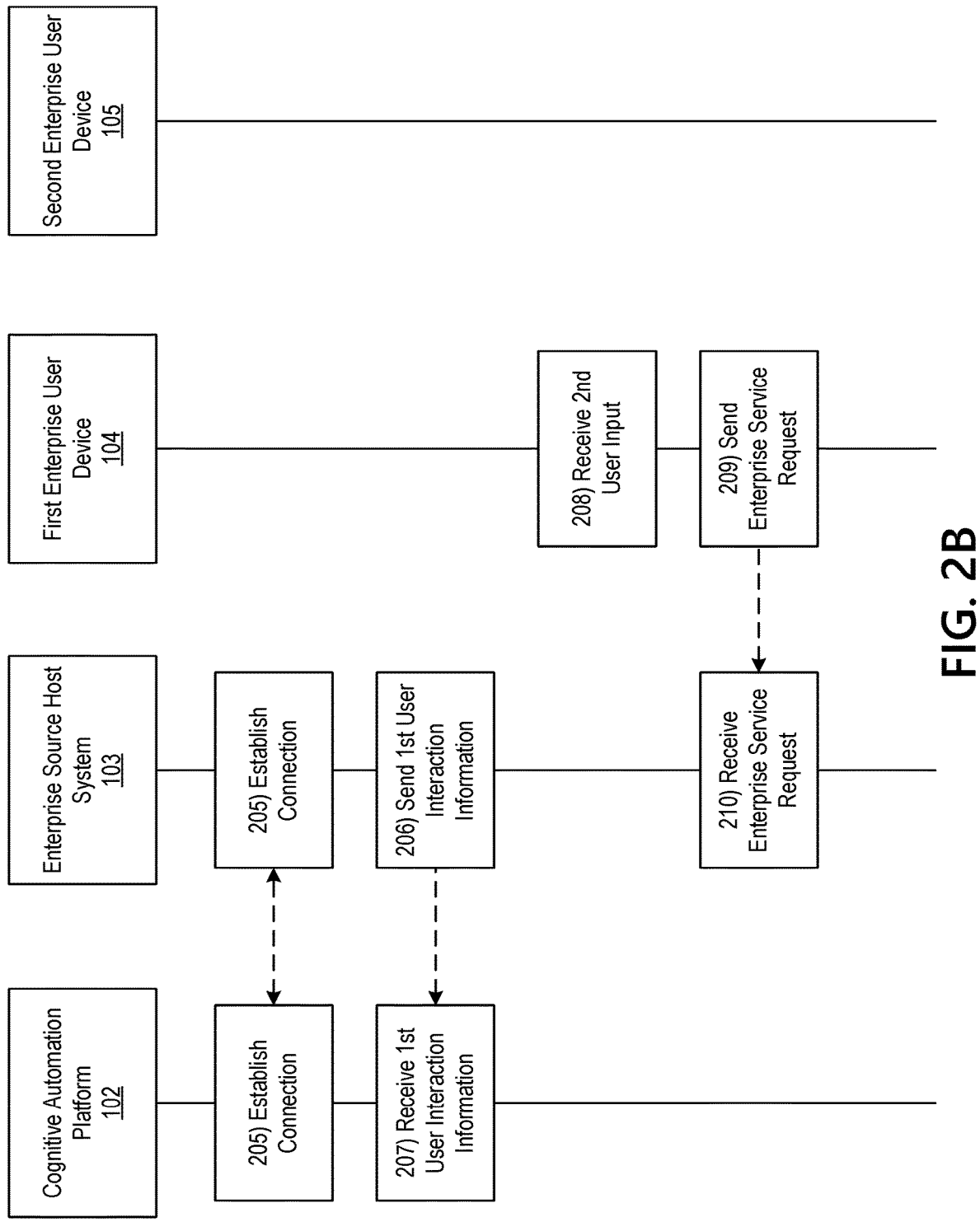

Referring to FIG. 2B, at step 205, the enterprise source host system 103 may establish a connection with cognitive automation platform 102. For example, the enterprise source host system 103 may establish a second wireless data connection with the cognitive automation platform 102 to link the enterprise source host system 103 to the cognitive automation platform 102. In some instances, the enterprise source host system 103 identify whether a connection is already established with the cognitive automation platform 102. If a connection is already established with the cognitive automation platform 102, the enterprise source host system 103 might not re-establish the connection. If a connection has not been established with the cognitive automation platform 102, the enterprise source host system 103 may establish the connection as described herein.

At step 206, the enterprise source host system 103 may send first user interaction information to the cognitive automation platform 102. For example, the enterprise source host system 103 may send information indicating how the first user interacted with the various user interfaces at step 203 and/or metadata corresponding to the first user's interactions (e.g., time, day, date, week, month, or the like when the interactions were performed). In some instances, the enterprise source host system 103 may send the first user interaction information to the cognitive automation platform 102 while the second wireless data connection is established.

At step 207, the cognitive automation platform 102 may receive the first user interaction information, sent at step 206. In some instances, the cognitive automation platform 102 may receive the first user interaction information via the communication interface 113 and while the second wireless data connection is established. In one or more instances, after receiving the first user interaction information, the cognitive automation platform 102 may identify a final user interface and/or a user intent corresponding to the first user interaction information. Based on the first user interaction information, the final user interface, and/or the first user intent, the cognitive automation platform 102 may generate, train, and/or update a stored cognitive automation model so as to enable the cognitive automation model to identify correlations between the first user interaction information, the first user intent, and/or the final user interface.

As an example, the cognitive automation platform 102 may determine, based on the first user interaction information, that the first user opened a new checking account on March 5, and deposited money in the new checking account on the March 15. In this example, the cognitive automation platform 102 may determine that the first user intended to make a deposit into the new checking account of equal value to a paycheck that the first user received that day (e.g., by recognizing that March 15 is a common payday), and that the first user may want to deposit paychecks into this new checking account on the 1st and 15th of every month. Similarly, the cognitive automation platform 102 may identify that final user interface displayed (e.g., the graphical user interface displayed at step 204) instructed the first user on how to perform the deposit. Accordingly, in these instances, the cognitive automation platform 102 may store correlations between the actions that the first user performed, the first user's intent corresponding to the performed actions, and a final graphical user interface that allowed the first user to accomplish their intended task.

At step 208, the first enterprise user device 104 may receive a second user input, which may, for example, be a request to access the enterprise service. In some instances, the first enterprise user device 104 may receive the second user input from the same user, user account, or the like that provided the first user input. Actions performed at step 208 may be similar to those described above at step 201.

At step 209, the first enterprise user device 104 may send an enterprise service request to the enterprise source host system 103. In some instances, the first enterprise user device 104 may send the enterprise service request to the enterprise source host system 103 while the first wireless data connection is established. For example, at step 209, the first user may login to their ATM account using his or her PIN number, and the first enterprise user device 104 may display a graphical user interface similar to graphical user interface 305 that presents various options for the first user (one of which may be selected by the first user). Actions performed at step 209 may be similar to an initial communication between the first enterprise user device 104 and the enterprise source host system 103 as described above at step 202.

At step 210, the enterprise source host system 103 may receive the enterprise service request sent at step 209. For example, the enterprise source host system 103 may receive the login credentials for the first user's ATM account and/or information indicating which task was selected by the first user (e.g., deposit, withdrawal, transfer funds, or the like). In some instances, the enterprise source host system 103 may receive the enterprise service request sent at step 209 while the first wireless data connection is established. Actions performed at step 210 may be similar to receipt of an initial communication from the first enterprise user device 104 at the enterprise source host system 103 as described above at step 202.

Figure 2C:
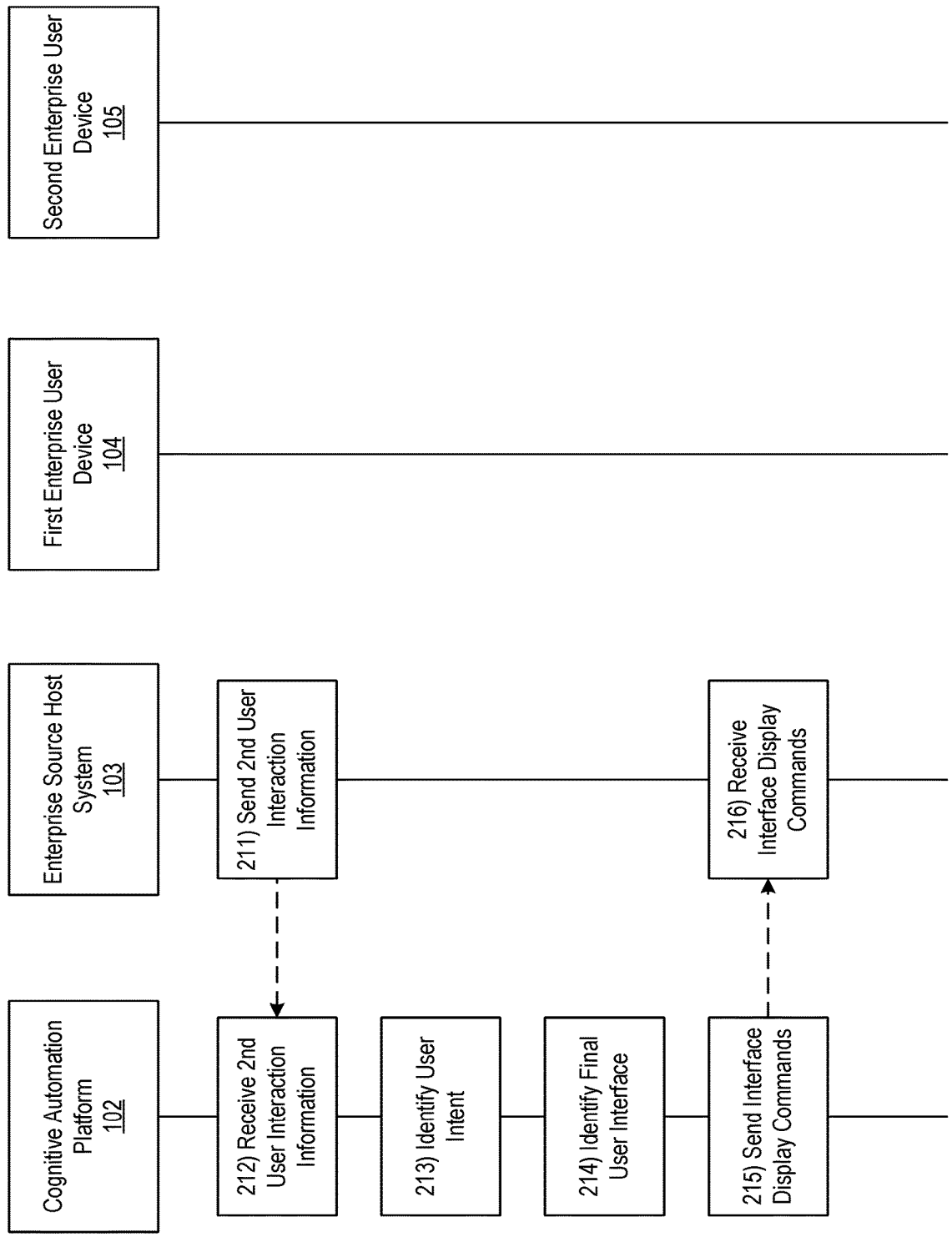

Referring to FIG. 2C, at step 211, the enterprise source host system 103 may send second user interaction information to the cognitive automation platform 102. For example, the enterprise source host system 103 may send information indicating how the first user interacted with first enterprise user device at step 208 and/or metadata corresponding to the first user's interactions (e.g., time, day, date, week, month, or the like when the interactions were performed). In some instances, the enterprise source host system 103 may send the second user interaction information to the cognitive automation platform 102 while the second wireless data connection is established. Actions performed at step 211 may be similar to those described above with regard to step 206.

At step 212, the cognitive automation platform 102 may receive the second user interaction information from the enterprise source host system 103. For example, cognitive automation platform 102 may receive information indicating how the first user interacted with first enterprise user device at step 208 and/or metadata corresponding to the first user's interactions (e.g., time, day, date, week, month, or the like when the interactions were performed). In some instances, the enterprise source host system 103 may receive the second user interaction information via the communication interface 113 and while the second wireless data connection is established.

At step 213, the cognitive automation platform 102 may identify a second user intent based on the second user interaction information received at step 211. For example, the cognitive automation platform 102 may identify that the first user is making a deposit, and may identify that it is April 15. Accordingly, the cognitive automation platform 102 may identify that the first user intends to make a deposit equal to a value of his or her paycheck into the checking account. In some instances, the cognitive automation platform 102 may identify the second user intent using the cognitive automation model. For example, the cognitive automation platform 102 may compare the second user interaction information to other stored user interaction information that was previously processed (e.g., the first user interaction information). In this example, the cognitive automation platform 102 may determine that the comparison of the first user interaction information to the second user interaction information results in an intent confidence score that exceeds a predetermined intent confidence threshold. Accordingly, the cognitive automation platform 102 may identify that the first user intent corresponding to the second user interaction information is the same as the first user intent corresponding to the first user interaction information.

At step 214, the cognitive automation platform 102 may identify a final user interface that should be displayed to satisfy the first user intent identified at step 213. For example, the cognitive automation platform 102 may apply the cognitive automation model to identify, based on the second user interaction information and/or the first user intent, a final user interface that should be displayed. For example, the cognitive automation platform 102 may compare the second user interaction information and/or user intent to other stored user interaction information and/or intents that were previously processed (e.g., the first user interaction information, the first user intent, or the like). In this example, the cognitive automation platform 102 may determine that the comparison of the first user interaction information and/or first user intent to the second user interaction information and/or second user intent results in an interface confidence score that exceeds a predetermined interface confidence threshold. Accordingly, the cognitive automation platform 102 may identify that the same final user interface should be displayed to satisfy the second user intent as was displayed to satisfy the first user intent (e.g., the final user interface displayed at step 204). For example, the cognitive automation platform 102 may identify that the graphical user interface 505 should be displayed at the first enterprise user device 104 to facilitate deposit of the first user's paycheck into the checking account.

At step 215, the cognitive automation platform 102 may send one or more commands directing enterprise source host system 103 to cause display of the final user interface, identified at step 214, at the first enterprise user device 104. In some instances, the cognitive automation platform 102 may send the final graphical user interface itself to the enterprise source host system 103. In other instances, the cognitive automation platform 102 may send information that may be used by the enterprise source host system 103 and/or the first enterprise user device 104 to generate the final graphical user interface. In some instances, the cognitive automation platform 102 may send one or more commands directing the enterprise source host system 103 to cause display of the final user interface via the communication interface 113 and while the second wireless data connection is established.

In one or more instances, in sending the one or more commands directing the enterprise source host system 103 to cause display of the final user interface, the cognitive automation platform 102 may cause the first enterprise user device 104 to transition from an initial graphical user interface to the final graphical user interface, without causing display of preceding graphical user interfaces of a sequence of graphical user interfaces previously used to access the final user interface (e.g., the user interfaces displayed during the communication between the enterprise source host system 103 and first enterprise user device 104 at step 203) and without prompting a first user to request the final user interface. In one or more instances, in sending the one or more commands directing the enterprise source host system 103 to cause display of the final user interface may cause the first enterprise user device 104 to display, on an initial user interface (e.g., the user interface at which the second user input is received), a shortcut to access the final graphical user interface. For example, where selection of the shortcut to access the final user interface may cause the first enterprise user device 104 to transition from the initial user interface to the final user interface, without causing display of preceding graphical user interfaces of a sequence of graphical user interfaces previously used to access the final user interface (e.g., the user interfaces displayed during the communication between the enterprise source host system 103 and first enterprise user device 104 at step 203).

At step 216, the enterprise source host system 103 may receive the one or more commands directing enterprise source host system 103 to cause display of the final user interface sent at step 215. In some instances, the enterprise source host system 103 may receive the final user interface itself. In other instances, the enterprise source host system 103 may receive information that may be used to generate the final user interface. In some instances, the one or more commands directing enterprise source host system 103 to cause display of the final user interface may be received by the enterprise source host system 103 while the second wireless data connection is established.

Figure 2D:
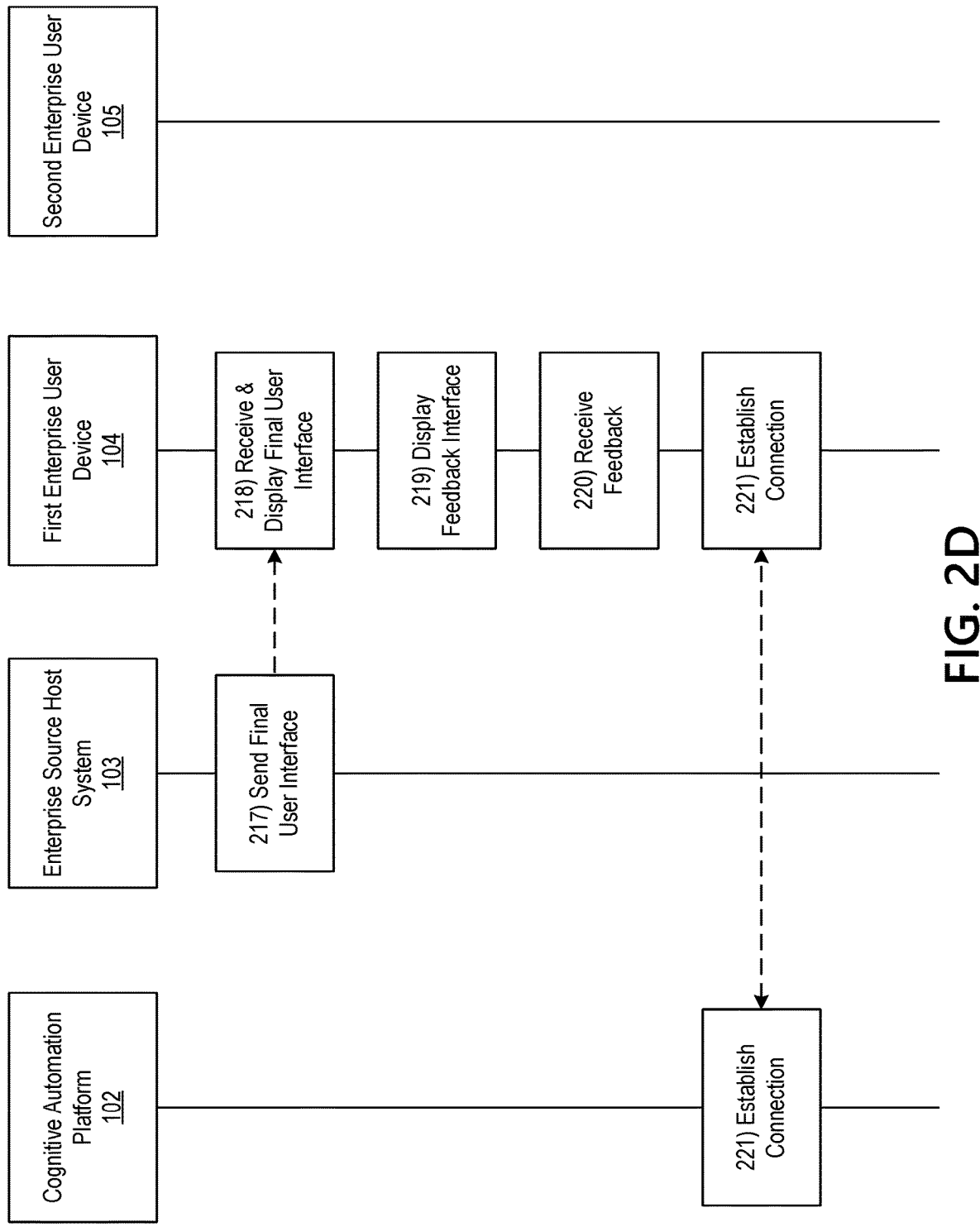

Referring to FIG. 2D, at step 217, the one or more commands directing enterprise source host system 103 to cause display of the final user interface may cause the enterprise source host system 103 to send the final user interface or information that may be used to generate the final user interface to the first enterprise user device 104. In some instances, the enterprise source host system 103 may send the final user interface along with one or more commands directing the first enterprise user device 104 to display the final user interface. In some instances, the enterprise source host system 103 may send the final user interface to the first enterprise user device 104 while the first wireless data connection is established.

At step 218, the first enterprise user device 104 may receive the final user interface or the information that may be used to generate the final user interface. In some instances, the first enterprise user device 104 may also receive the one or more commands directing the first enterprise user device 104 to display the final user interface. In some instances, first enterprise user device 104 may receive the final user interface while the first wireless data connection is established. After receiving the final user interface and/or the information that may be used to generate the final user interface, the first enterprise user device 104 may display the final user interface, which may in some instances, be the same graphical user interface that was displayed by the first enterprise user device 104 at step 204. In some instances, in displaying the final user interface, the first enterprise user device 104 may display a graphical user interface similar to graphical user interface 505, which is illustrated in FIG. 5 and is described above.

In some instances, the first enterprise user device 104 may display the final user interface without further input from the first user. In other instances, the first enterprise user device 104 may display a shortcut to the final user interface on the initially displayed user interface (e.g., the user interface used to receive the second user input, or the like), and may display the final user interface in response to receiving a selection of the shortcut. In doing so, the cognitive automation platform 102 may conserve network bandwidth by reducing back and forth communication between the enterprise source host system 103 and the first enterprise user device 104.

At step 219, the first enterprise user device 104 may display a feedback interface. In some instances, in displaying the feedback interface, the first enterprise user device 104 may display a graphical user interface similar to graphical user interface 605, which is shown in FIG. 6. For example, the first enterprise user device 104 may display a graphical user interface that may allow the first user to provide feedback regarding whether the final user interface, displayed at step 218, correctly matched an intent of the first user.

At step 220, the first enterprise user device 104 may receive feedback at the feedback interface. For example, the first enterprise user device 104 may receive feedback indicating that the final user interface either does or does not match an intent of the first user. For example, the first enterprise user device 104 may receive feedback that although the first user was trying to make a deposit on the 15th of the month, he or she was actually trying to make the deposit into a savings account. In this example, it might not save the first user time to automatically advance to the final user interface corresponding to checking account deposits.

In contrast, however, the first enterprise user device 104 may receive feedback that the first user was trying to make a deposit into his or her checking account. In this example, it may be more efficient to automatically advance to the final user interface corresponding to checking account deposits, rather than requesting additional inputs from the first user at one or more intermittent user interfaces.

At step 221, the first enterprise user device 104 may establish a connection with the cognitive automation platform 102. For example, the first enterprise user device 104 may establish a third wireless data connection with the cognitive automation platform 102 to link the first enterprise user device 104 to the cognitive automation platform 102. In some instances, the first enterprise user device 104 may identify whether a connection is already established with the cognitive automation platform 102. If a connection is already established with the cognitive automation platform 102, the first enterprise user device 104 might not re-establish the connection. If a connection is not already established with the cognitive automation platform 102, the first enterprise user device 104 may establish the third wireless data connection as described herein.

Figure 2E:
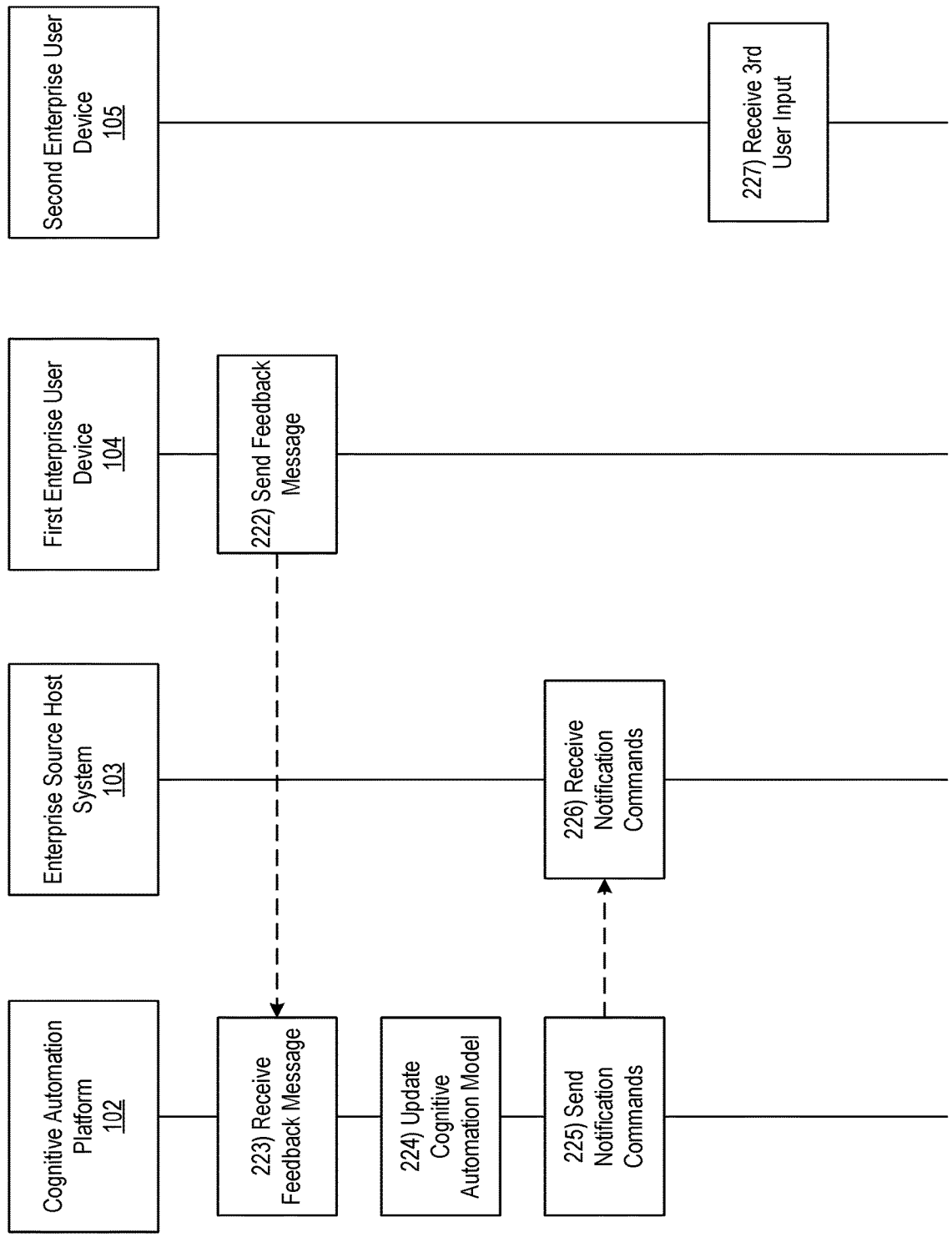

Referring to FIG. 2E, at step 222, first enterprise user device 104 may send a feedback message, based on the feedback received at step 220, to the cognitive automation platform 102. In some instances, the first enterprise user device 104 may send the feedback message to the cognitive automation platform 102 while the third wireless data connection is established.

At step 223, the cognitive automation platform 102 may receive the feedback message sent at step 222. In one or more instances, the cognitive automation platform 102 may receive the feedback message via the communication interface 113 and while the third wireless data connection is established.

At step 224, the cognitive automation platform 102 may update the cognitive automation model based on the received feedback message. For example, if the cognitive automation platform 102 receives a feedback message indicating that the final user interface did not match the first user's intent, the cognitive automation platform 102 may update the cognitive automation model to reflect that the final user interface should not be presented every time the second user interaction information and/or second user intent are identified. In contrast, if the cognitive automation platform 102 receives a feedback message indicating that the final user interface did match the first user's intent, the cognitive automation platform 102 may reinforce the cognitive automation model to reflect that the final user interface should continue to be presented to the first user if the second user interaction information and/or second user intent are identified.

At step 225, the cognitive automation platform 102 may generate and send one or more commands directing the enterprise source host system 103 to cause one or more messages, alerts, notifications, or the like to be displayed at the first enterprise user device 104. For example, the cognitive automation platform 102 may direct the enterprise source host system 103 to provide alerts to the first enterprise user device 104 based on the cognitive automation model. As a particular example, the cognitive automation platform 102 may cause the enterprise source host system 103 to direct the first enterprise user device 104 (which may, in these instances, be the first user's mobile device), to display a reminder to deposit a paycheck on the 15th of every month. In one or more instances, the cognitive automation platform 102 may send the one or more commands directing the enterprise source host system 103 to cause one or more messages, alerts, notifications, or the like to be displayed at the first enterprise user device 104 via the communication interface 113 and while the second wireless data connection is established.

At step 226, the enterprise source host system 103 may receive the one or more commands directing the enterprise source host system 103 to cause one or more messages, alerts, notifications, or the like to be displayed at the first enterprise user device 104. In some instances, the enterprise source host system 103 may receive the one or more commands directing the enterprise source host system 103 to cause one or more messages, alerts, notifications, or the like to be displayed at the first enterprise user device 104 while the second wireless data connection is established. In some instances, based on the received commands directing the enterprise source host system 103 to cause one or more messages, alerts, notifications, or the like to be displayed at the first enterprise user device 104, the enterprise source host system 103 may cause the first enterprise user device 104 to display one or more messages, alerts, notifications, or the like. For example, as described above at step 225, the enterprise source host system 103 may cause the first enterprise user device 104 (which may, in these instances, be a user's mobile device) to display a reminder to deposit a paycheck on the 15th of every month. In some instances, the first enterprise user device 104 may display this notification within an online banking application or portal.

At step 227, the second enterprise user device 105 may receive a third user input. In receiving the third user input, the second enterprise user device 105 may receive input from a user different from the first user (e.g., a second user). Actions performed at step 227 may otherwise be similar to those performed at step 208 with regard to the second user input.

Figure 2F:
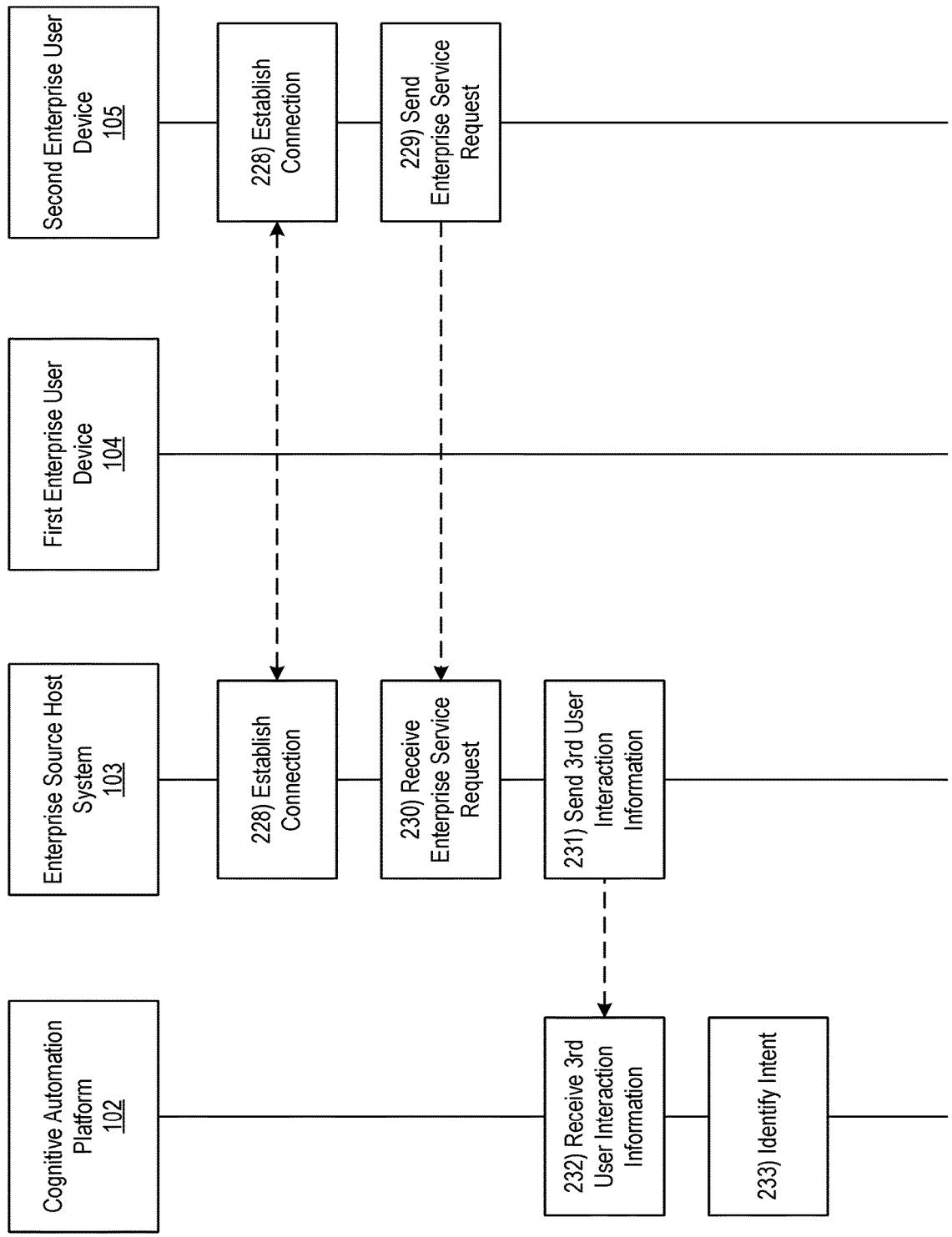

Referring to FIG. 2F, at step 228, the second enterprise user device 105 may establish a connection with enterprise source host system 103. For example, the second enterprise user device 105 may establish a fourth wireless data connection with the enterprise source host system 103 to link the second enterprise user device 105 to the enterprise source host system 103. In some instances, the second enterprise user device 105 may identify whether a connection is already established with the enterprise source host system 103. If a connection is already established with the enterprise source host system 103, the second enterprise user device 105 might not re-establish the connection with the enterprise source host system 103. If a connection is not already established with the enterprise source host system 103, the second enterprise user device 105 may establish the fourth wireless data connection as described herein.

At step 229, the second enterprise user device 105 may generate and send an enterprise service request to the enterprise source host system 103. In some instances, the second enterprise user device 105 may send the enterprise service request to the enterprise source host system 103 while the fourth wireless data connection is established. For example, at step 229, a second user may login to their ATM account using his or her PIN number, and the second enterprise user device 105 may display a graphical user interface similar to graphical user interface 305 that presents various options for the second user (one of which may be selected by the second user). Actions performed at step 229 may be similar to those described above with regard to the first enterprise user device 104 at step 209.

At step 230, the enterprise source host system 103 may receive the enterprise service request sent at step 229. For example, the enterprise source host system 103 may receive the login credentials for the second user's ATM account and/or information indicating which task was selected by the second user (e.g., deposit, withdrawal, transfer funds, or the like). In some instances, the enterprise source host system 103 may receive the enterprise service request sent at step 229 while the fourth wireless data connection is established. Actions performed at step 230 may be similar those described above with regard to the first enterprise user device 104 at step 210.

At step 231, the enterprise source host system 103 may send third user interaction information to the cognitive automation platform 102. For example, the enterprise source host system 103 may send information indicating how the second user interacted with second enterprise user device at step 229 and/or metadata corresponding to the second user's interactions (e.g., time, day, date, week, month, or the like when the interactions were performed). In some instances, the enterprise source host system 103 may send the third user interaction information to the cognitive automation platform 102 while the second wireless data connection is established. Actions performed at step 231 may be similar to those described above at step 211 with regard to the second user interaction information.

At step 232, the cognitive automation platform 102 may receive the third user interaction information sent at step 231. For example, cognitive automation platform 102 may receive information indicating how the second user interacted with second enterprise user device at step 229 and/or metadata corresponding to the second user's interactions (e.g., time, day, date, week, month, or the like when the interactions were performed). In some instances, the enterprise source host system 103 may receive the third user interaction information via the communication interface 113 and while the second wireless data connection is established. Actions performed at step 232 may be similar to those described at step 232 with regard to the second user interaction information.

At step 233, the cognitive automation platform 102 may identify an intent of the second user (e.g., a third user intent) based on the third user interaction information. For example, the cognitive automation platform 102 may identify that the second user is making a deposit, and may identify that it is April 15. Accordingly, the cognitive automation platform 102 may identify that the second user intends to make a deposit equal to a value of his or her paycheck into the checking account. In some instances, the cognitive automation platform 102 may identify the third user intent using the cognitive automation model. For example, the cognitive automation platform 102 may compare the third user interaction information to other stored user interaction information that was previously processed (which may be user interaction information corresponding to other users such as the first user interaction information, the second user interaction information, or the like). In this example, the cognitive automation platform 102 may determine that the comparison of the third user interaction to the second user interaction information and/or first user interaction information results in an intent confidence score that exceeds the predetermined intent confidence threshold. Accordingly, the cognitive automation platform 102 may identify that the third user intent may correspond to the first and second user intents (e.g., the intent of the first user identified at step 213). Actions performed at step 233 may be similar to those described above at step 213 with regard to the second user intent.

Figure 2G:
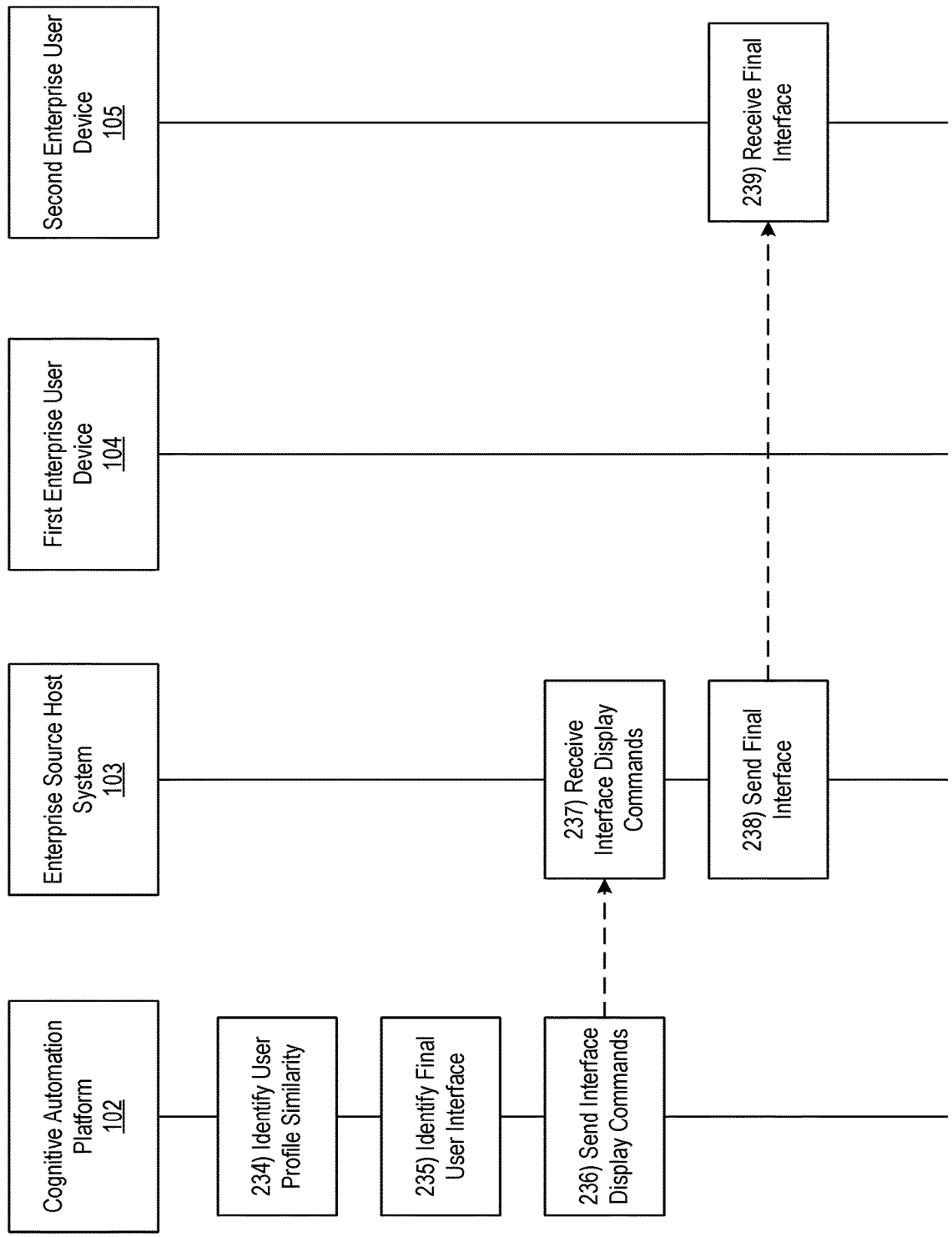

Referring to FIG. 2G, at step 234, after identifying that the third user intent may correspond to the first and second user intents, the cognitive automation platform 102 may compare user profiles of the second user and the first user. For example, the cognitive automation platform 102 may use the cognitive automation model to compare the user profiles and identify whether the profiles result in a profile comparison score that exceeds a predetermined profile comparison threshold (e.g., based on geographical region, occupation, account balance, age, or the like). For example, in performing the comparison, the cognitive automation platform 102 may identify that both the first and second users are employees of the same business in the same geographical region, and have a balance of funds in their respective checking accounts that is within a predetermined balance window of each other. If the cognitive automation platform 102 determines that the profile comparison score does exceed the predetermined profile comparison threshold, the cognitive automation platform 102 may confirm that the intents of the first and second users match, and that cognitive automation analysis may be used to identify intents for the second user from the user interaction information of the first user. This may allow the cognitive automation platform 102 to leverage user interaction information from other similarly situated users to improve the cognitive automation analysis used to identify interaction patterns and intents. If the cognitive automation platform 102 determines that the profile comparison score does not exceed the predetermined profile comparison threshold, the cognitive automation platform may determine that user interaction information from the first user should not be used in cognitive automation analysis for the second user. In some instances, by analyzing user interaction information from multiple users, the cognitive automation platform 102 may identify popularity scores for each interface. In these instances, the cognitive automation platform 102 may cause the enterprise source host system 103 may delete interfaces from storage if their corresponding popularity scores are less than a predetermined popularity threshold. In doing so, the cognitive automation platform 102 may conserve storage resources.

At step 235, the cognitive automation platform 102 may identify a final user interface that should be displayed to satisfy the user intent identified at step 233 (the third user intent). For example, the cognitive automation platform 102 may apply the cognitive automation model to identify, based on the third user interaction information and/or the third user intent, a final user interface that should be displayed. For example, the cognitive automation platform 102 may compare the third user interaction information and/or user intent to other stored user interaction information and/or intents that were previously processed (e.g., the first user interaction information, the first user intent, the second user interaction information, the second user intent, or the like). In this example, the cognitive automation platform 102 may determine that the comparison of the third user interaction information and/or third user intent to the first user interaction information, the first user intent, the second user interaction information, and/or the second user intent, results in an interface confidence score that exceeds a predetermined interface confidence threshold. Similarly, the cognitive automation platform 102 may determine that comparison of the profile for the second user to the profile for the first user results in a profile comparison score that exceeds the profile comparison threshold. Accordingly, the cognitive automation platform 102 may identify that the third user intent corresponding to the third user interaction information is the same as the first user intent corresponding to the first user interaction information and/or the second user intent corresponding to the second user interaction information. For example, the cognitive automation platform may identify that the graphical user interface 505 should be displayed at the second enterprise user device 105 to facilitate deposit of the second user's paycheck into his or her checking account. Actions performed at step 235 may be similar to those described above at step 214 with regard to the first user.

At step 236, the cognitive automation platform 102 may send one or more commands directing enterprise source host system 103 to cause display of the final user interface, identified at step 235, at the second enterprise user device 105. In some instances, the cognitive automation platform 102 may send the final graphical user interface itself to the enterprise source host system 103. In other instances, the cognitive automation platform 102 may send information that may be used by the enterprise source host system 103 and/or the second enterprise user device 105 to generate the final graphical user interface. In some instances, the cognitive automation platform 102 may send one or more commands directing the enterprise source host system 103 to cause display of the final user interface via the communication interface 113 and while the second wireless data connection is established. Actions performed at step 236 may be similar to those described above at step 215 with regard to the first enterprise user device 104.

At step 237, the enterprise source host system 103 may receive the one or more commands directing enterprise source host system 103 to cause display of the final user interface sent at step 236. In some instances, the enterprise source host system 103 may receive the final user interface itself. In other instances, the enterprise source host system 103 may receive information that may be used to generate the final user interface. In some instances, the one or more commands directing enterprise source host system 103 to cause display of the final user interface may be received by the enterprise source host system 103 while the second wireless data connection is established. Actions performed at step 237 may be similar to those described above at step 216 with regard to the first enterprise user device 104.

At step 238, the one or more commands directing enterprise source host system 103 to cause display of the final user interface may cause the enterprise source host system 103 to send the final user interface or information that may be used to generate the final user interface to the second enterprise user device 105. In some instances, the enterprise source host system 103 may send the final user interface along with one or more commands directing the second enterprise user device 105 to display the final user interface. In some instances, the enterprise source host system 103 may send the final user interface to the second enterprise user device 105 while the first fourth data connection is established. Actions performed at step 238 may be similar to those described above with regard to the first enterprise user device at step 217.

At step 239, the second enterprise user device 105 may receive the final user interface or the information that may be used to generate the final user interface. In some instances, the second enterprise user device 105 may also receive the one or more commands directing the second enterprise user device 105 to display the final user interface. In some instances, second enterprise user device 105 may receive the final user interface while the fourth wireless data connection is established. Actions performed at step 239 may be similar to those described above with regard to the first enterprise user device 104 at step 217.

Figure 2H:
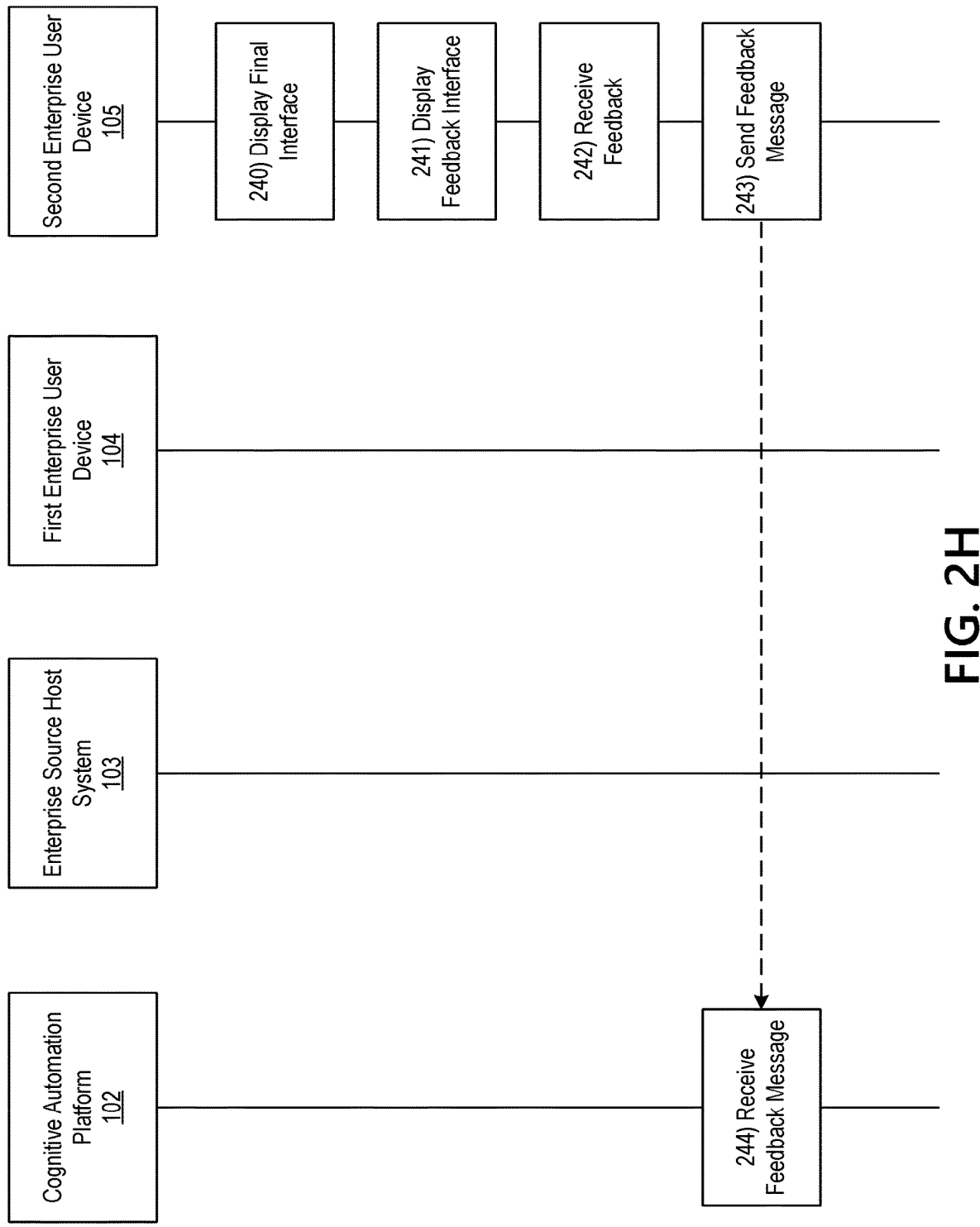
Figure 21:
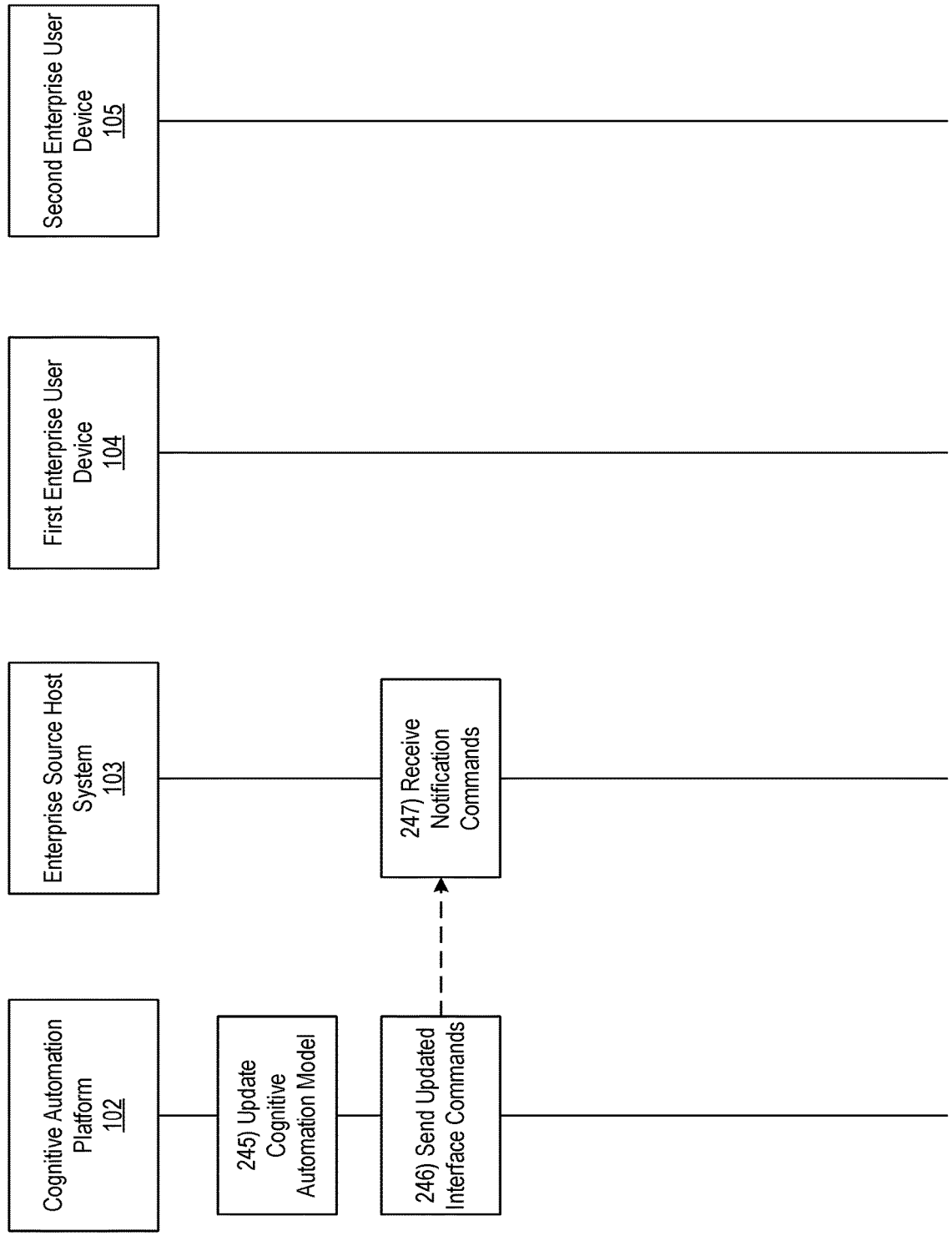

Referring to FIG. 2H, at step 240, after receiving the final user interface and/or the information that may be used to generate the final user interface, the second enterprise user device 105 may display the final user interface, which may in some instances, be the same graphical user interface as was displayed by the first enterprise user device 104 at steps 204 and 218. In some instances, in displaying the final user interface, the second enterprise user device 105 may display a graphical user interface similar to graphical user interface 505, which is illustrated in FIG. 5 and is described above. Actions performed at step 240 may be similar to those described above with regard to the first enterprise user device 104 at step 217. In doing so, the cognitive automation platform 102 may conserve network bandwidth by reducing back and forth communication between the enterprise source host system 103 and the first enterprise user device 104.

At step 241, the second enterprise user device 105 may display a feedback interface. In some instances, in displaying the feedback interface, the second enterprise user device 105 may display a graphical user interface similar to graphical user interface 605, which is shown in FIG. 6. For example, the second enterprise user device 105 may display a graphical user interface that may allow the second user to provide feedback regarding whether the final user interface, displayed at step 241, correctly matched an intent of the second user. Actions performed at step 241 may be similar to those described above at step 219 with regard to the first enterprise user device 104.

At step 242, the second enterprise user device 105 may receive feedback at the feedback interface. For example, the second enterprise user device 105 may receive feedback indicating that the final user interface either does or does not match an intent of the second user. For example, the second enterprise user device 105 may receive feedback that although the second user was trying to make a deposit on the 15th of the month, he or she may have actually been trying to make the deposit into a savings account. In this example, it might not save the second user time to automatically advance to the final user interface corresponding to checking account deposits. In contrast, however, the second enterprise user device 105 may receive feedback that the second user was trying to make a deposit into his or her checking account. In this example, it may be more efficient to automatically advance to the final user interface corresponding to checking account deposits, rather than requesting additional inputs from the second user at one or more intermittent user interfaces. Actions performed at step 242 may be similar to those described above with regard the first enterprise user device 104 at step 220.

At step 243, the second enterprise user device 105 may establish a connection with the cognitive automation platform 102. For example, the second enterprise user device 105 may establish a fifth wireless data connection with the cognitive automation platform 102 to link the second enterprise user device 105 to the cognitive automation platform 102. In some instances, the second enterprise user device 105 may identify whether a connection was previously established with the cognitive automation platform 102. If a connection was previously established with the cognitive automation platform 102, the second enterprise user device 105 might not re-establish the connection. If a connection was not previously established with the cognitive automation platform 102, the second enterprise user device 105 may establish the fifth wireless data connection as described herein. Once the fifth wireless data connection is established, the second enterprise user device 105 may send a feedback message, based on the feedback received at step 242, to the cognitive automation platform 102. In some instances, the second enterprise user device 105 may send the feedback message to the cognitive automation platform 102 while the fifth wireless data connection is established. Actions performed at step 243 may be similar to those described above with regard to the first enterprise user device 104 at steps 221 and 222.

At step 244, the cognitive automation platform 102 may receive the feedback message sent at step 243. In one or more instances, the cognitive automation platform 102 may receive the feedback message via the communication interface 113 and while the fifth wireless data connection is established. Actions performed at step 244 may be similar to those described above at step 223.

Referring to FIG. 2I, at step 245, the cognitive automation platform 102 may update the cognitive automation model based on the received feedback message. For example, if the cognitive automation platform 102 receives a feedback message indicating that the final user interface did not match the second user's intent, the cognitive automation platform 102 may update the cognitive automation model to reflect that the final user interface should not be presented every time the third user interaction information and/or third user intent are identified. In contrast, if the cognitive automation platform 102 receives a feedback message indicating that the final user interface did match the second user's intent, the cognitive automation platform 102 may reinforce the cognitive automation model to reflect that the final user interface should continue to be presented to the second user if the third user interaction information and/or third user intent are identified. Actions performed at step 245 may be similar to those described above at step 224.

At step 246, the cognitive automation platform 102 may generate and send one or more commands directing the enterprise source host system 103 to cause one or more messages, alerts, notifications, or the like to be displayed at the second enterprise user device 105. For example, the cognitive automation platform 102 may direct the enterprise source host system 103 to provide alerts to the second enterprise user device 105 based on the cognitive automation model. As a particular example, the cognitive automation platform 102 may cause the enterprise source host system 103 to direct the second enterprise user device 105 (which may, in these instances, be a user's mobile device), to display a reminder to deposit a paycheck on the 15th of every month. In one or more instances, the cognitive automation platform 102 may send the one or more commands directing the enterprise source host system 103 to cause one or more messages, alerts, notifications, or the like to be displayed at the second enterprise user device 105 via the communication interface 113 and while the second wireless data connection is established. Actions performed at step 246 may be similar to those described above at step 225.

At step 247, the enterprise source host system 103 may receive the one or more commands directing the enterprise source host system 103 to cause one or more messages, alerts, notifications, or the like to be displayed at the second enterprise user device 105. In some instances, the enterprise source host system 103 may receive the one or more commands directing the enterprise source host system 103 to cause one or more messages, alerts, notifications, or the like to be displayed at the second enterprise user device 105 while the second wireless data connection is established. In some instances, based on the received commands directing the enterprise source host system 103 to cause one or more messages, alerts, notifications, or the like to be displayed at the second enterprise user device 105, the enterprise source host system 103 may cause the second enterprise user device 105 to display one or more messages, alerts, notifications, or the like. For example, as described above at step 246, the enterprise source host system 103 may cause the second enterprise user device 105 (which may, in these instances, be a user's mobile device) to display a reminder to deposit a paycheck on the 15th of every month. In some instances, the second enterprise user device 105 may display this notification within an online banking application or portal.

It should be understood that although steps 201-247 are primarily described with regard to the illustrative use case of making a deposit at an ATM, one or more of the systems or methods described herein may relate to any number of use cases such as, for example, making a withdrawal at an ATM, transferring funds, performing online banking activities at a mobile and/or personal computing device, generating reports, or the like. In some instances, these additional use cases may relate to enterprise organizations other than a financial institution. Furthermore, although a series of illustrative user interfaces are shown in FIGS. 3-5, it should be understood that the decision trees of user interfaces that may be displayed to perform a particular task may include any number of user interfaces, and thus any number of interim user interfaces may be avoided by advancing from an initial user interface to a final user interface through cognitive automation techniques.

Figure 7:
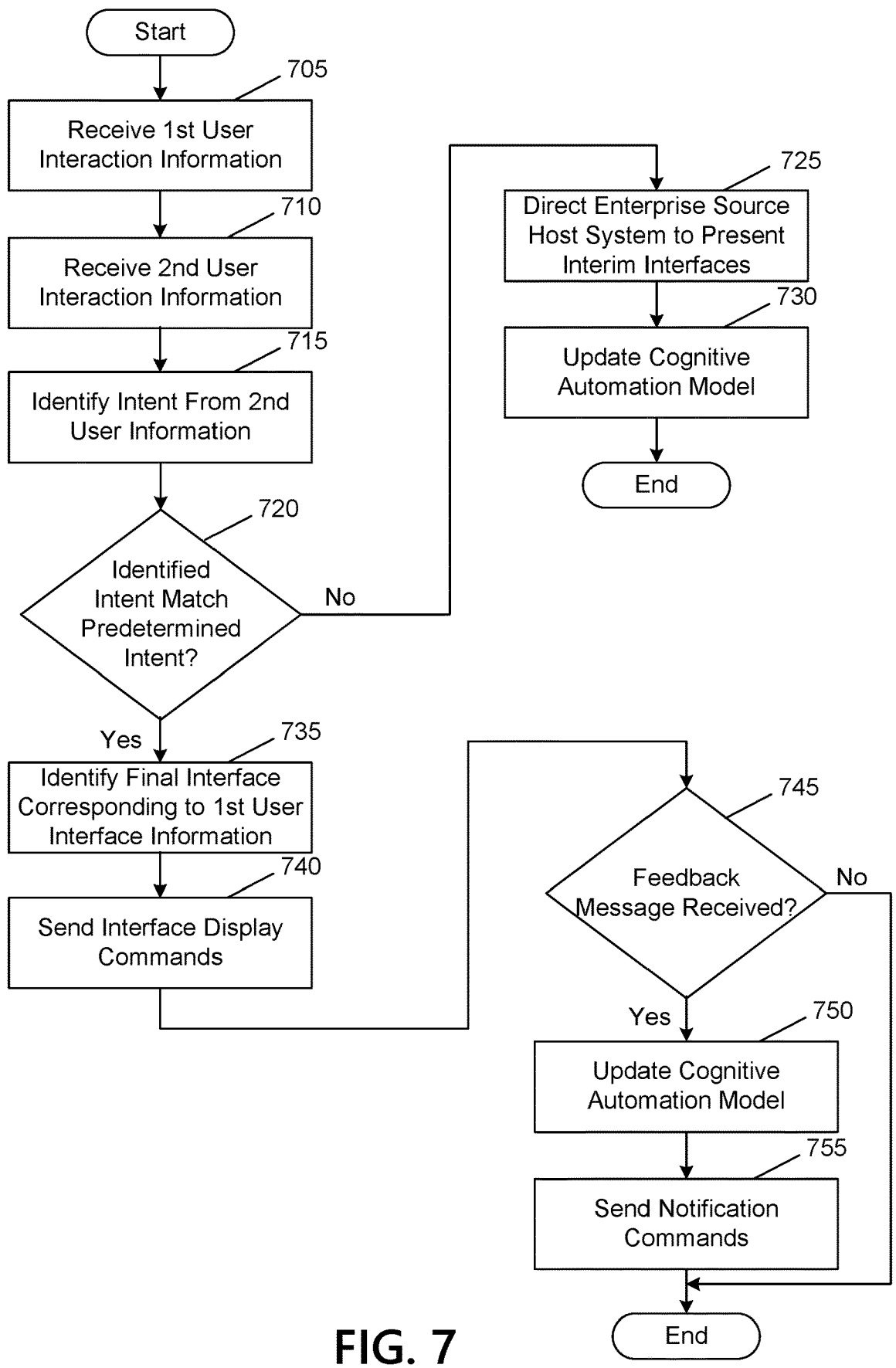
FIG. 7 depicts an illustrative method for implementing cognitive automation techniques for customized user interface generation in accordance with one or more example embodiments.

FIG. 7 depicts an illustrative method that implements cognitive automation in user interface generation in accordance with one or more example embodiments. Referring to FIG. 7, at step 705, a computing platform having at least one processor, a communication interface, and memory may receive first user interaction information. At step 710, the computing platform may receive second user interaction information. At step 715, the computing platform may identify a user intent from the second user interaction information. At step 720, the computing platform may determine whether the identified intent matches a predetermined intent. If the determined intent does not match a predetermined intent, the computing platform may proceed to step 725.

At step 725, the computing platform may direct enterprise source host system to present interim interfaces. At step 730, the computing platform may update a cognitive automation model based on a final user interface used to satisfy the identified user intent.

Returning to step 720, if the determined intent does match a predetermined intent, the computing platform may proceed to step 735. At step 735, the computing platform may identify a final user interface corresponding to the first user interaction information. At step 740, the computing platform may generate and send one or more commands directing an enterprise user device to display the final user interface identified at step 735. At step 745, the computing platform may determine whether a feedback message was received. If not, the method may end. If a feedback message was received, the computing platform may proceed to step 750. At step 750, the computing platform may update a cognitive automation model based on the feedback. At step 755, the computing platform may send one or more commands directing an enterprise source host system to cause display of one or more notifications at the enterprise user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
receive first user interaction information from a first user;
identify, based on the first user interaction information, a first user intent;
identify, using a cognitive automation model, a final graphical user interface corresponding to the first user intent, wherein the final graphical user interface comprises a last graphical user interface, of a sequence of graphical user interfaces, that was displayed at a user device to satisfy the first user intent;
send one or more commands directing an enterprise source host system to cause display of the final graphical user interface corresponding to the first user intent without causing display of preceding graphical user interfaces of the sequence of graphical user interfaces;
receive, from the user device, a feedback message indicating a level of satisfaction with the final graphical user interface;
identify, based on a frequency of interaction for the first user with a particular user interface element of the final graphical user interface, that the particular user interface element should be removed from the final graphical user interface prior to causing subsequent display of the final graphical user interface;
update, based on the feedback message, the cognitive automation model;
receive second user interaction information from a second user, wherein the first user interaction information corresponds to a first user profile for the first user and the second user interaction information corresponds to a second user profile for the second user, the second user profile being different than the first user profile;
identify, by comparing the second user interaction information to the first user interaction information, that the second user interaction information corresponds to the first user intent;
identify, using the cognitive automation model, the final graphical user interface corresponding to the first user intent; and
send one or more commands directing the enterprise source host system to cause display of the final graphical user interface corresponding to the first user intent without causing display of the preceding graphical user interfaces of the sequence of graphical user interfaces, wherein causing display of the final graphical user interface for the second user comprises causing display of the final graphical user interface without the particular user interface element.

2. The computing platform of claim 1, wherein sending the one or more commands directing the enterprise source host system to cause display of the final graphical user interface corresponding to the first user intent without causing display of the preceding graphical user interfaces of the sequence of graphical user interfaces causes the user device to transition from an initial graphical user interface to the final graphical user interface, without causing display of the preceding graphical user interfaces of the sequence of graphical user interfaces and without prompting a user to request the final graphical user interface.

3. The computing platform of claim 1, wherein sending the one or more commands directing the enterprise source host system to cause display of the final graphical user interface corresponding to the first user intent without causing display of the preceding graphical user interfaces of the sequence of graphical user interfaces causes the user device to display, on an initial graphical user interface, a shortcut to access the final graphical user interface, wherein selection of the shortcut to access the final graphical user interface causes the user device to transition from the initial graphical user interface to the final graphical user interface, without causing display of the preceding graphical user interfaces of the sequence of graphical user interfaces.

4. The computing platform of claim 1, wherein the user device comprises an automated teller machine.

5. The computing platform of claim 1, wherein the memory stores additional computer-readable instructions that, when executed by the at least one processor, further cause the computing platform to:
receive third user interaction information;
determine that the third user interaction information does not correspond to a previously identified intent;
generate one or more commands directing the enterprise source host system to present interim graphical user interfaces until a final graphical user interface corresponding to a second user intent is accessed; and
update, using the third user interaction information and the second user intent, the cognitive automation model.

6. The computing platform of claim 1, wherein the memory stores additional computer-readable instructions that, when executed by the at least one processor, further cause the computing platform to:
generate, using the cognitive automation process and based on the first user interaction information, a recommendation message indicating that a recommended action should be performed at a later time.

7. The computing platform of claim 1, wherein the memory stores additional computer-readable instructions that, when executed by the at least one processor, further cause the computing platform to:
compare the first user profile to the second user profile to generate a profile comparison score; and
compare the profile comparison score to a predetermined profile comparison threshold, wherein identifying that the second user interaction information corresponds to the first user intent is based on determining that the profile comparison score exceeds the predetermined profile comparison threshold.

8. The computing platform of claim 7, wherein comparing the first user profile to the second user profile comprises comparing one or more of: a geographical region, an occupation, an account balance, or an age corresponding to each of the first user profile and the second user profile.

9. The computing platform of claim 1, wherein the memory stores additional computer-readable instructions that, when executed by the at least one processor, further cause the computing platform to:
identify, for the first user and after identifying the final graphical user interface corresponding to the first user intent, that a notification should be sent to a user device for the first user, wherein the first user interaction information was received on a calendar date of a particular month, and wherein the notification comprises a reminder that a paycheck should be deposited on the same calendar date of a subsequent month;

identify, by comparing the first user profile to the second user profile, that the first user profile corresponds to the second user profile; and send, to a user device for the second user and before receiving the second user interaction information from the second user, the notification, wherein the notification prompts the second user to provide the second user interaction information.

10. A method comprising:

at a computing platform comprising at least one processor, a communication interface, and memory:

receiving first user interaction information from a first user;

identifying, based on the first user interaction information, a first user intent;

identifying, using a cognitive automation model, a final graphical user interface corresponding to the first user intent, wherein the final graphical user interface comprises a last graphical user interface, of a sequence of graphical user interfaces, that was displayed at a user device to satisfy the first user intent;

sending one or more commands directing an enterprise source host system to cause display of the final graphical user interface corresponding to the first user intent without causing display of preceding graphical user interfaces of the sequence of graphical user interfaces;

receiving, from the user device, a feedback message indicating a level of satisfaction with the final graphical user interface;

identifying, based on a frequency of interaction for the first user with a particular user interface element of the final graphical user interface, that the particular user interface element should be removed from the final graphical user interface prior to causing subsequent display of the final graphical user interface;

updating, based on the feedback message, the cognitive automation model;

receiving second user interaction information from a second user, wherein the first user interaction information corresponds to a first user profile for the first user and the second user interaction information corresponds to a second user profile for the second user, the second user profile being different than the first user profile;

identifying, by comparing the second user interaction information to the first user interaction information, that the second user interaction information corresponds to the first user intent;

identifying, using the cognitive automation model, the final graphical user interface corresponding to the first user intent; and sending one or more commands directing the enterprise source host system to cause display of the final graphical user interface corresponding to the first user intent without causing display of the preceding graphical user interfaces of the sequence of graphical user interfaces, wherein causing display of the final graphical user interface for the second user comprises causing display of the final graphical user interface without the particular user interface element.

11. The method of claim 10, wherein sending the one or more commands directing the enterprise source host system to cause display of the final graphical user interface corresponding to the first user intent without causing display of the preceding graphical user interfaces of the sequence of graphical user interfaces causes the user device to transition from an initial graphical user interface to the final graphical user interface, without causing display of the preceding graphical user interfaces of the sequence of graphical user interfaces and without prompting a user to request the final graphical user interface.

12. The method of claim 10, wherein sending the one or more commands directing the enterprise source host system to cause display of the final graphical user interface corresponding to the first user intent without causing display of the preceding graphical user interfaces of the sequence of graphical user interfaces causes the user device to display, on an initial graphical user interface, a shortcut to access the final graphical user interface, wherein selection of the shortcut to access the final graphical user interface causes the user device to transition from the initial graphical user interface to the final graphical user interface, without causing display of the preceding graphical user interfaces of the sequence of graphical user interfaces.

13. The method of claim 10, wherein the user device comprises an automated teller machine.

14. The method of claim 10, further comprising:

receiving third user interaction information;

determining that the third user interaction information does not correspond to a previously identified intent;

generating one or more commands directing the enterprise source host system to present interim graphical user interfaces until a final graphical user interface corresponding to a second user intent is accessed; and updating, using the third user interaction information and the second user intent, the cognitive automation model.

15. The method of claim 10, further comprising:

receiving third user interaction information;

identifying, based the third user interaction information, a second user intent;

identifying, using the cognitive automation model, that the second user intent does not match another user intent stored in the cognitive automation model;

generating one or more commands directing the enterprise source host system to present interim graphical user interfaces until a final graphical user interface corresponding to the second user intent is accessed; and updating, using the second user intent and the final graphical user interface corresponding to the second user intent, the cognitive automation model.

16. The method of claim 10, further comprising:

generating, using the cognitive automation process and based on the first user interaction information, a recommendation message indicating that a recommended action should be performed at a later time.

17. The method of claim 10, further comprising:

comparing the first user profile to the second user profile to generate a profile comparison score; and comparing the profile comparison score to a predetermined profile comparison threshold, wherein identifying that the second user interaction information corresponds to the first user intent is based on determining that the profile comparison score exceeds the predetermined profile comparison threshold.

18. The method of claim 17, wherein comparing the first user profile to the second user profile comprises comparing one or more of: a geographical region, an occupation, an account balance, or an age corresponding to each of the first user profile and the second user profile.

19. One or more non-transitory computer-readable media storing instructions that, when executed by a computing platform comprising at least one processor, a communication interface, and memory, cause the computing platform to:
- receive first user interaction information from a first user;
- identify, based on the first user interaction information, a first user intent;
- identify, using a cognitive automation model, a final graphical user interface corresponding to the first user intent, wherein the final graphical user interface comprises a last graphical user interface, of a sequence of graphical user interfaces, that was displayed at a user device to satisfy the first user intent;
- send one or more commands directing an enterprise source host system to cause display of the final graphical user interface corresponding to the first user intent without causing display of preceding graphical user interfaces of the sequence of graphical user interfaces;
- receive, from the user device, a feedback message indicating a level of satisfaction with the final graphical user interface;
- identify, based on a frequency of interaction for the first user with a particular user interface element of the final graphical user interface, that the particular user interface element should be removed from the final graphical user interface prior to causing subsequent display of the final graphical user interface;
- update, based on the feedback message, the cognitive automation model;
- receive second user interaction information from a second user, wherein the first user interaction information corresponds to a first user profile for the first user and the second user interaction information corresponds to a second user profile for the second user, the second user profile being different than the first user profile;
- identify, by comparing the second user interaction information to the first user interaction information, that the second user interaction information corresponds to the first user intent;
- identify, using the cognitive automation model, the final graphical user interface corresponding to the first user intent; and
- send one or more commands directing the enterprise source host system to cause display of the final graphical user interface corresponding to the first user intent without causing display of the preceding graphical user interfaces of the sequence of graphical user interfaces, wherein causing display of the final graphical user interface for the second user comprises causing display of the final graphical user interface without the particular user interface element.

20. The one or more non-transitory computer-readable media of claim 19, wherein sending the one or more commands directing the enterprise source host system to cause display of the final graphical user interface corresponding to the first user intent without causing display of the preceding graphical user interfaces of the sequence of graphical user interfaces causes the user device to transition from an initial graphical user interface to the final graphical user interface, without causing display of the preceding graphical user interfaces of the sequence of graphical user interfaces and without prompting a user to request the final graphical user interface.

* * * * *